US012757162B2

(12) United States Patent
Gupta et al.

(10) Patent No.: US 12,757,162 B2
(45) Date of Patent: Oct. 6, 2026

(54) PAGING TIMING COLLISION CONTROL

(71) Applicant: APPLE INC., Cupertino, CA (US)

(72) Inventors: Vivek G. Gupta, San Jose, CA (US); Sethuraman Gurumoorthy, San Ramon, CA (US); Sridhar Prakasam, Fremont, CA (US)

(73) Assignee: APPLE INC., Cupertino, CA (US)

( * ) Notice: Subject to any disclaimer, the term of this patent is extended or adjusted under 35 U.S.C. 154(b) by 249 days.

(21) Appl. No.: 18/525,707

(22) Filed: Nov. 30, 2023

(65) Prior Publication Data

US 2024/0098690 A1 Mar. 21, 2024

Related U.S. Application Data

(63) Continuation of application No. 17/518,404, filed on Nov. 3, 2021, now Pat. No. 11,864,156.

(60) Provisional application No. 63/248,367, filed on Sep. 24, 2021.

(51) Int. Cl.
*H04W 68/00* (2009.01)
*H04W 8/26* (2009.01)
*H04W 60/04* (2009.01)
*H04L 101/654* (2022.01)

(52) U.S. Cl.
CPC ........... *H04W 68/005* (2013.01); *H04W 8/26* (2013.01); *H04W 60/04* (2013.01); *H04L 2101/654* (2022.05)

(58) Field of Classification Search
CPC ..... H04W 68/005; H04W 8/26; H04W 60/04; H04L 2101/654
USPC .......................................................... 370/329
See application file for complete search history.

(56) References Cited

U.S. PATENT DOCUMENTS

| | | | |
|---|---|---|---|
| 10,805,973 B2 | 10/2020 | Babu et al. | |
| 11,864,156 B2 | 1/2024 | Gupta et al. | |
| 2010/0203906 A1* | 8/2010 | Fang .................. | H04W 68/025 455/458 |
| 2012/0064891 A1 | 3/2012 | Wijayanathan et al. | |
| 2016/0183240 A1 | 6/2016 | Hu et al. | |
| 2017/0150466 A1 | 5/2017 | Sunell et al. | |
| 2020/0037243 A1 | 1/2020 | Tamura et al. | |
| 2020/0329455 A1 | 10/2020 | Ryu et al. | |
| 2021/0014822 A1 | 1/2021 | Gurumoorthy et al. | |
| 2022/0264506 A1 | 8/2022 | Kiss et al. | |

(Continued)

FOREIGN PATENT DOCUMENTS

| | | |
|---|---|---|
| CN | 110446259 A | 11/2019 |
| CN | 110574431 A | 12/2019 |

(Continued)

OTHER PUBLICATIONS

Paging Collision Avoidance for Multi-RAT MUSIM UE, 3Generation Partnership Project Technical Specification Group-Radio Access Network Working Group2 Meeting #113-e, R2-2100434, Jan. 25-Feb. 5, 2021, 4 pages.

(Continued)

*Primary Examiner* — Mark G. Pannell
(74) *Attorney, Agent, or Firm* — Kilpatrick Townsend & Stockton LLP

(57) ABSTRACT

The present application relates to devices and components including apparatus, systems, and methods for paging timing collision control, with respect to exchange of offset values (e.g., IMSI offset values) between a user equipment and a network.

18 Claims, 13 Drawing Sheets

(56) References Cited

U.S. PATENT DOCUMENTS

| | | | | |
|---|---|---|---|---|
| 2022/0322269 A1 | 10/2022 | Chen et al. | | |
| 2023/0034780 A1 | 2/2023 | Lin et al. | | |
| 2023/0122569 A1* | 4/2023 | Sriram | H04W 60/04 455/458 | |
| 2024/0147405 A1* | 5/2024 | Lin | H04W 68/02 | |

FOREIGN PATENT DOCUMENTS

| | | |
|---|---|---|
| CN | 112218370 A | 1/2021 |
| CN | 113271659 A | 8/2021 |
| WO | 2018161244 A1 | 9/2018 |

OTHER PUBLICATIONS

China Patent Application No. 202211117148.4, Office Action, Apr. 1, 2025, 13 pages.
"[Draft] E-mail Discussion: [Post111-e][917][Multi-SIM] Multi-Sim (Vivo)", 3GPP TSG-RAN WG2 Meeting #112e, R2-20xxxxx , Nov. 2-13, 2020 , 53 pages.
"3GPP TR 23.761 V1.5.0", 3rd Generation Partnership Project; Technical Specification Group Services and System Aspects; Study on System Enablers for Devices having Multiple Universal Subscriber Identity Modules (USIM) (Release 17) , Jun. 2021 , 108 pages.
"3GPP TR 33.873 V17.1.0", 3rd Generation Partnership Project; Technical Specification Group Services and System Aspects; Study on the Security of the System Enablers for Devices having Multiple Universal Subscriber Identity Modules (MUSIM); (Release 17) , Sep. 2021 , 11 pages.
"3GPP TS 23.401 V17.1.0", 3rd Generation Partnership Project; Technical Specification Group Services and System Aspects; General Packet Radio Service (GPRS) Enhancements for Evolved Universal Terrestrial Radio Access Network (E-UTRAN) Access (Release 17) , Jun. 2021 , 448 pages.
"3GPP TS 24.301 V17.4.0", 3rd Generation Partnership Project; Technical Specification Group Core Network and Terminals; Non-Access-Stratum (NAS) Protocol for Evolved Packet System (EPS); Stage 3 (Release 17) , Sep. 2021 , 569 pages.
"3GPP TS 24.501 V17.3.1", 3rd Generation Partnership Project; Technical Specification Group Core Network and Terminals; Non-Access-Stratum (NAS) Protocol for 5G System (5GS); Stage 3 (Release 17) , Jun. 2021 , 825 pages.
"KI#1 Interim Evaluations", Huawei, 3GPP TSG-WG SA2 Meeting #140E e-meeting, S2-2005487r014 , Aug. 19-Sep. 1, 2020 , 5 pages.
"LS on Paging Subgrouping", 3GPP TSG-RAN WG2 Meeting #114 Electronic, R2-2106552 , May 19-27, 2021 , 1 page.
"Negotiated IMSI Offset Assigned and Lower Layer Failure Before Tau Complete is Received by Network", Mediatek Inc., 3GPP TSG-CT WG1 Meeting #131-e, C1-214070 , Aug. 19-27, 2021 , 3 pages.
"New SID on the Security of the System Enablers for Devices having Multiple Universal Subscriber Identity Modules (USIM)", SA WG3, TSG SA Meeting #SA-90E, SP-201131 , Dec. 8-14, 2020 , 3 pages.
"New WID on Enabling Multi-USIM Devices", 3GPP TSG-CT Meeting #91e, CP-210280, Intel Mar. 18-24, 2021 , 4 pages.
"New WID on System Enablers for Multi-USIM Devices", SA WG2, TSG SA Meeting #SP-90E, SP-200978 , Dec. 8-14, 2020 , 3 pages.
"Resolving the Editor's Note Related to Supporting Paging Timing Collision Control as a Capability for MUSIM in EPS", 3GPP TSG-CT WG1 Meeting #131-e, C1-215170 , Aug. 19-27, 2021 , 24 pages.
"Revised SID: Study on System Enablers for Multi-SIM Devices", 3GPP TSG SA Meeting #87E, SP-200297 , Mar. 17-20, 2020 , 4 pages.
"Revised WID: Core Part: Support for Multi-SIM Devices for LTE/NR", Vivo, China Telecom, China Unicom, 3GPP TSG RAN Meeting #90e, RP-202895 , Dec. 7-11, 2020 , 5 pages.
The U.S. Appl. No. 17/518,404, "Non-Final Office Action", mailed Mar. 7, 2023, 12 pages.
The U.S. Appl. No. 17/518,404, "Notice of Allowance", mailed Aug. 24, 2023, 10 pages.
The U.S. Appl. No. 17/518,404, "Notice of Allowance", mailed Dec. 16, 2023, 11 pages.
The European Application No. EP22194931.6, "Extended European Search Report", mailed on Feb. 14, 2023, 14 pages.
Office Action issued in China Application No. CN202211117148.4, dated Sep. 30, 2025 in 4 pages.
Office Action issued in European Application No. EP22194931.6, dated Mar. 6, 2026 in 9 pages.

* cited by examiner

800

PAGING TIMING COLLISION CONTROL

CROSS-REFERENCES TO RELATED APPLICATIONS

This application is a continuation of U.S. Nonprovisional application Ser. No. 17/518,404, entitled "Paging Timing Collision Control," filed on Nov. 3, 2021, which claims priority to U.S. Provisional Application No. 63/248,367, filed on Sep. 24, 2021, the entire contents of which are incorporated herein by reference for all purposes.

BACKGROUND

Third Generation Partnership Project (3GPP) Technical Specifications (TSs) define standards for wireless networks. These TSs describe aspects related to mobility for operation within such networks.

DETAILED DESCRIPTION

Figure 1:
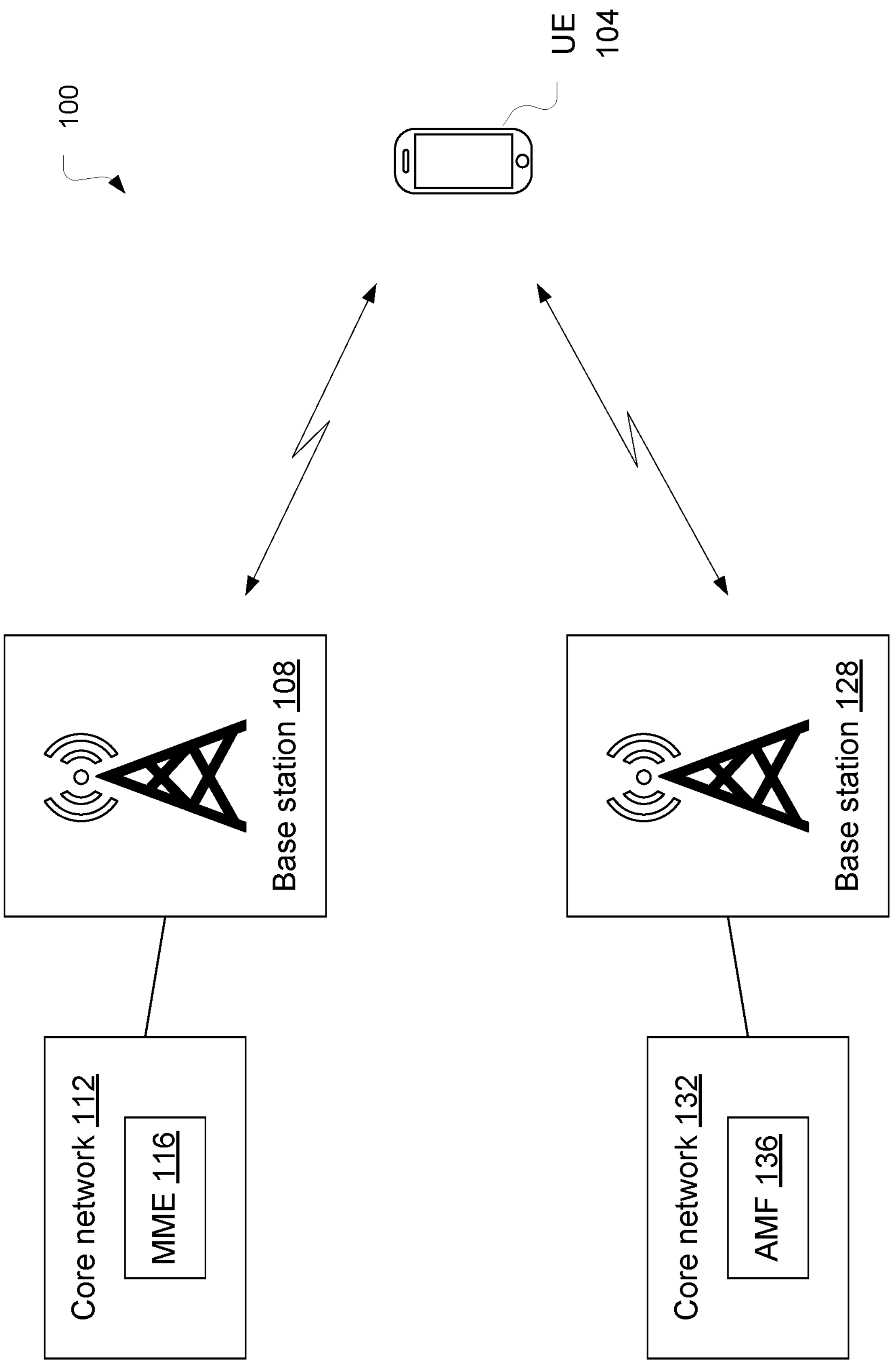
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below).

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for paging timing collision control are described herein. Such techniques may relate, for example, to UEs that support multiple Universal Subscriber Identity Modules (MUSIM devices). In some cases, such a technique may allow a UE and a network to recover from a lower-layer failure error case and enable the UE to continue to receive paging in a battery-efficient manner.

FIG. 1 illustrates a network environment 100 in accordance with some embodiments. The network environment 100 may include a UE 104 and base stations (BSs) 108 and 128. The UE 104 may be a MUSIM device as described below. The UE 104 may operate in accordance with, or in a manner compatible to, Long Term Evolution (LTE) or Fifth Generation (5G) New Radio (NR) system standards as provided by 3GPP TSs.

Each base station 108/128 may provide a wireless access cell (for example, an LTE cell or an NR cell) to provide user plane and control plane protocol terminations toward the UE 104. For example, base station 108 may be an evolved node B (eNB) providing an LTE access cell and being coupled with an evolved packet core network (EPC) 112 of an Evolved Packet System (EPS), and base station 128 may be an ng-eNB providing an LTE access cell and coupled with a 5th Generation Core network (5GC) of a 5G system (5GS) or may be a gNB providing an NR access cell and coupled with a 5GC of a 5GS. The UE 104 may communicate with base stations 108 and 128 over air interfaces compatible with 3GPP TSs such as those that define Fifth Generation (5G) NR system standards.

The network environment 100 may further include a core network (CN) 112. For example, the CN 112 may comprise an EPC. The CN 112 may communicate with the base station 108 via a fiber optic or wireless backhaul. The CN 112 may provide functions for the UE 104 via the base station 108. These functions may include managing subscriber profile information, subscriber location, authentication of services, or switching functions for voice and data sessions.

The CN 112 may include a Mobility Management Entity (MME) 116, which may be implemented in one or more servers or other devices in a centralized location or in distributed locations. The MME 116 may be a control plane function that provides registration management, connection management, reachability management, and mobility management services and may serve as a termination point of the Non-Access Stratum (NAS). Registration management may allow a UE to register and deregister with the CN 112. Upon registration, a UE context may be created within the CN 112. The UE context may be a set of parameters that identify and characterize the UE. The UE context may include identity information, subscription information, capability information, access and mobility information, or protocol data unit (PDU) session information. Connection management may be used to establish and release control plane signaling connection between a UE and the MME 116. Establishing a control plane signaling connection moves a UE from connection management (CM)-idle to CM-connected. Reachability management may allow a UE to be found and paged when a mobile terminated connection is desired. Mobility management may be used to maintain knowledge of a UE's location within a network. In some embodiments, the BS 108 may be coupled with MME 116 of the core network 112 with an S1-MME interface. The S1-MME interface may use an S1 application protocol (S1-AP) to transfer signaling messages (e.g., NAS messages) between the BS 108 and the MME 116.

The network environment 100 may further include a core network (CN) 132. For example, the CN 132 may comprise a 5GC. The CN 132 may communicate with the base station 128 via a fiber optic or wireless backhaul. The CN 132 may provide functions for the UE 104 via the base station 128. These functions may include managing subscriber profile information, subscriber location, authentication of services, or switching functions for voice and data sessions.

The CN 132 may include an Access and Mobility Management Function (AMF) 136, which may be implemented in one or more servers or other devices in a centralized location or in distributed locations. The AMF 136 may be a control plane function that provides registration management, connection management, reachability management, and mobility management services and may serve as a termination point of the NAS. Registration management may allow a UE to register and deregister with the CN 132. Upon registration, a UE context may be created within the CN 132. The UE context may be a set of parameters that identify and characterize the UE. The UE context may include identity information, subscription information, capability information, access and mobility information, or protocol data unit (PDU) session information. Connection management may be used to establish and release control plane signaling connection between a UE and the AMF 136. Establishing a control plane signaling connection moves a UE from connection management (CM)-idle to CM-connected. Reachability management may allow a UE to be found and paged when a mobile terminated connection is desired. Mobility management may be used to maintain knowledge of a UE's location within a network. In some embodiments, the BS 128 may be coupled with AMF 136 of the core network 132 with an NG-control (NG-C) interface. The NG-C interface may use a next-generation application protocol (NGAP) to transfer signaling messages (e.g., NAS messages) between the BS 128 and the AMF 136.

Many UEs (e.g., handsets, smartphones, etc.) that support more than one USIM card are currently deployed. Such UEs, which are referred to as multi-USIM or MUSIM devices, have been especially popular in emerging economies and Asian countries, and the use of MUSIM devices is spreading to other regions as well. The number of USIMs supported by a MUSIM device is typically two, but support for more than two USIMs is also possible.

In a typical use case, the user of a MUSIM device has multiple subscriptions and uses the MUSIM device to access both (or all) of these subscriptions with the same device. For example, the user may use the USIM device to access a personal subscription and a business subscription. Additionally or alternatively, the user may use the USIM device to access multiple personal subscriptions (e.g., an individual subscription and a "family plan" subscription). In either case, the USIMs associated with the various subscriptions may be from the same mobile network operator, or from different mobile network operators.

The universe of MUSIM devices that currently exist includes a range of diverse and proprietary implementations that may behave very differently from one another. Support for MUSIM in current 3GPP TSs is limited and sparse, and operations relating to MUSIM are currently handled in an implementation-specific and largely unpredictable manner.

To reduce costs, a MUSIM device is typically configured to share radio and/or baseband components across the various USIMs. Such sharing may lead to performance issues during use of the device in a 3GPP system. While in active communication with a first system, for example, the MUSIM device may need to occasionally check another system (e.g., to monitor paging occasions, to read system information blocks (SIBs)), and such an operation may adversely affect performance on one or both of the systems depending upon how the device is implemented.

Paging collisions may occur during use of a MUSIM device, especially when the same UE identifier value is associated with more than one USIM of the device, and such collisions may lead to missed pages. When the UE does receive a page on the second system, it may have insufficient information about the service type that triggered the page to know how to respond. If the UE is unable to respond to a page on the second system without suspending ongoing activity on the first system, the UE may need to drop the RRC connection and stop activity on the first system, leading to a reduced user experience and wastage of system resources.

Open questions regarding support for MUSIM in a 3GPP system may include any of the following: how to handle mobile terminated (MT) service for a first USIM of a UE while the UE is actively communicating on a second USIM; how to enable paging reception and/or avoid paging collisions in a MUSIM device; how to handle service prioritization when a UE which is active on a first USIM receives a page on a second USIM; how USIM configuration and user preferences determine behavior of a MUSIM device; how to co-ordinate leaving to suspend ongoing activity on one USIM and resume it later, in order to allow the UE to temporarily attend to activity on another USIM. It may be desired to provide support for MUSIM in a 3GPP system, as such support may enable standardized and/or more cost-efficient implementations of MUSIM devices.

A MUSIM device can be paged over multiple radio access technologies (RATs) over which the device may be registered with different systems. The device may be unable to monitor paging on all 3GPP RATs simultaneously (e.g., due to sharing of radio and/or baseband components among the USIMs) and hence may need to make a choice of paging channels to monitor. Such limitations may lead to unsuccessful paging on some paging channel(s) and, in some cases, missed pages.

It may be desired to enable paging reception across both USIMs for a MUSIM device operating in an EPS and/or in a 5GS. For example, it may be desired to specify how a system may operate when paging across different 3GPP RATs with pages that overlap in time and/or to consider whether the system needs to be aware of specific UE constraints (such as single Rx) in order for a MUSIM device to be able to receive paging.

To reduce power consumption, a UE that is registered with a system but is not currently engaged in an active communication with the system may operate in an idle mode. The UE may wake up from idle mode according to a discontinuous reception (DRX) cycle in order to monitor a paging channel. When DRX is used, the UE only needs to monitor one paging occasion per DRX cycle. For a MUSIM device, the UE needs to monitor one paging occasion per DRX cycle for each USIM.

A paging occasion is a subframe that occurs within a Paging Frame (PF). The UE determines the PF according to the following equation as set forth in clause 7.1 of 3GPP Technical Specification (TS) 36.304 ("LTE; Evolved Universal Terrestrial Radio Access (E-UTRA); User Equipment (UE) procedures in idle mode"), v16.4.0 (2021-09):

$$SFN \bmod T = (T/N) * (\mathrm{UE\_ID} \bmod N)$$

where SFN denotes the System Frame Number, T denotes the duration (in frames) of the DRX cycle of the UE (e.g., as defined in System Information Block 2 (SIB2)), N is the minimum of T and a value nB (e.g., as defined in SIB2), and UE_ID is a UE Identity Index Value. For EPC, the UE_ID is based on the UE's international mobile subscriber identity (IMSI). For 5GC, the UE_ID is based on the UE's 5G-S-temporary mobile subscriber identifier (5G-S-TMSI) (e.g., as defined in clause 5.9.4 of 3GPP TS 23.501 ("3rd Generation Partnership Project; Technical Specification Group Services and System Aspects; System architecture for the 5G System (5GS); Stage 2"), v17.1.1 (2021-06)).

The paging occasion is determined by an index i_s that points to a subframe pattern as defined in clause 7.2 of 3GPP TS 36.304. The value of i_s is derived from the following calculation:

$$i\_s = \text{floor}(UE\_ID/N) \bmod Ns,$$

where Ns=max(1, nB/T).

Clause 4.3.33.5 of 3GPP TS 23.401 ("3rd Generation Partnership Project; Technical Specification Group Services and System Aspects; General Packet Radio Service (GPRS) enhancements for Evolved Universal Terrestrial Radio Access Network (E-UTRAN) access"), v17.1.0 (2021-06) describes that an IMSI offset value may be used to avoid possible paging collisions and increase the likelihood that paging is received successfully for different USIMs of a MUSIM device. The UE and the MME may negotiate the IMSI offset value and use it to calculate an alternative IMSI value as described in clause 4.3.33.5. The UE and the MME may then use the alternative IMSI value instead of the IMSI to obtain the UE_ID that is used to derive the paging occasions as set forth in clause 7.1 of 3GPP TS 36.304 as described above.

To avoid paging collisions between two networks, a MUSIM device may initiate a Tracking Area Update (TAU) procedure with an MME of an EPC to request an IMSI offset from the MME (e.g., as described in clause 5.5.3 of 3GPP TS 24.301 ("3rd Generation Partnership Project; Technical Specification Group Core Network and Terminals; Non-Access-Stratum (NAS) protocol for Evolved Packet System (EPS); Stage 3"), v17.3.0 (2021-06)).

The UE may initiate the TAU procedure by sending a TRACKING AREA UPDATE REQUEST message that includes a Requested IMSI offset to the MME. In response to the TRACKING AREA UPDATE REQUEST message, the MME sends a TRACKING AREA UPDATE ACCEPT message that includes a Negotiated IMSI offset to the UE and stores the Negotiated IMSI Offset in the UE Context. The Negotiated IMSI offset may have the same value as the Requested IMSI offset, or the Negotiated IMSI offset may have a different value than the Requested IMSI offset. In response to the TRACKING AREA UPDATE ACCEPT message, the UE sends a TRACKING AREA UPDATE COMPLETE message to the MME.

Alternatively, a MUSIM device may initiate an Attach procedure (e.g., as described in clause 5.5.1 of 3GPP TS 24.301) to attach to the EPS and also to request an IMSI offset value from the MME. The UE may initiate the Attach procedure by sending an ATTACH REQUEST message that includes a Requested IMSI offset to the MME. In response to the ATTACH REQUEST message, the MME sends an ATTACH ACCEPT message that includes a Negotiated IMSI offset to the UE and stores the Negotiated IMSI Offset in the UE Context. The Negotiated IMSI offset may have the same value as the Requested IMSI offset, or the Negotiated IMSI offset may have a different value than the Requested IMSI offset. In response to the ATTACH ACCEPT message, the UE sends an ATTACH COMPLETE message to the MME.

Figure 2:
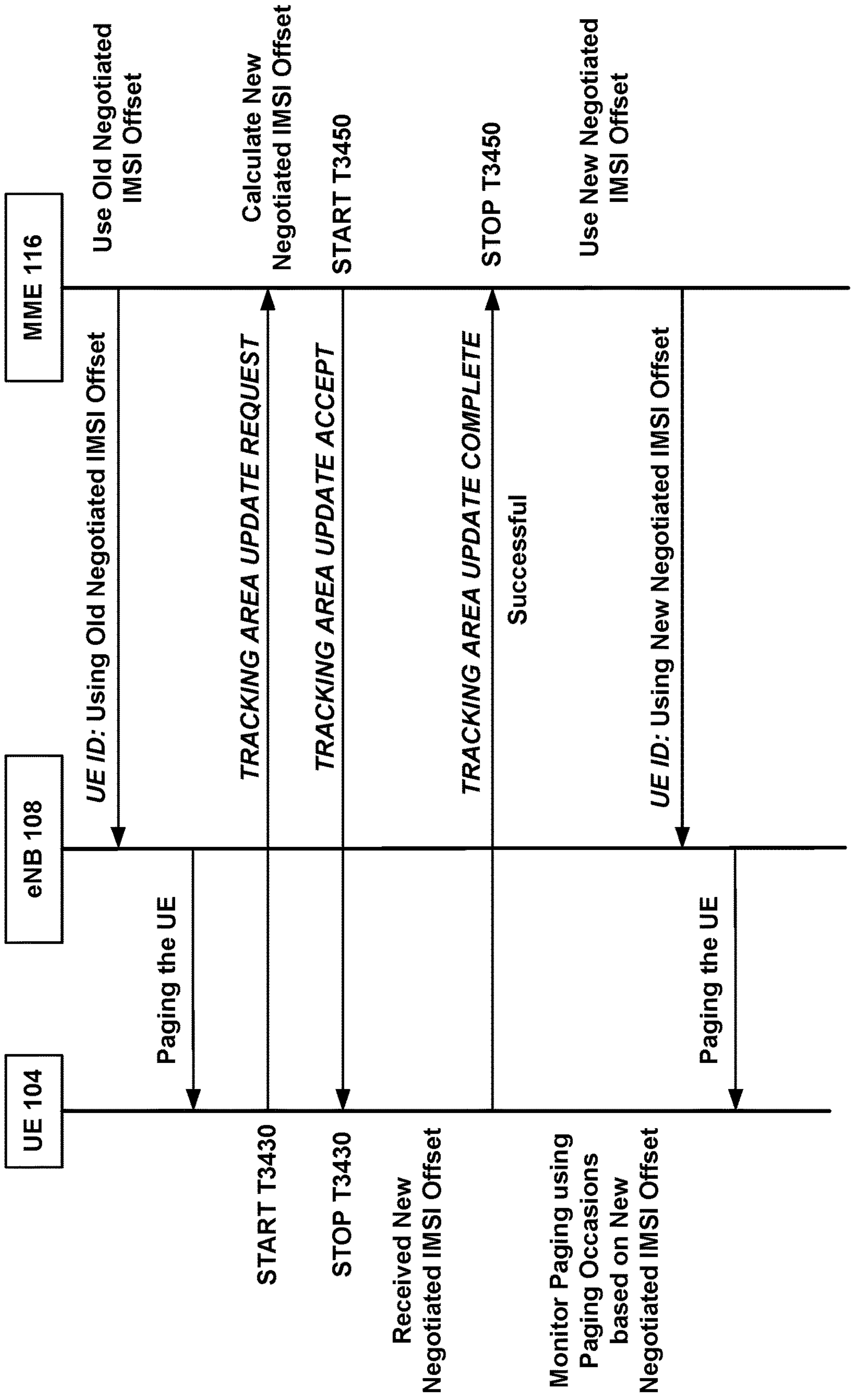
FIG. 2 shows an example of using a Tracking Area Update procedure to exchange a Negotiated IMSI Offset value between a user equipment and a network according to some embodiments.

FIG. 2 shows an example of using a TAU procedure to successfully exchange a Negotiated IMSI Offset value between MUSIM device 104 and MME 116 via eNB 108, and a subsequent switch to paging using paging occasions that are based on the new Negotiated IMSI Offset value. Before the UE 104 initiates the TAU procedure, MME 116 may use a prior Negotiated IMSI Offset value (or the IMSI value, if no IMSI offset has yet been negotiated) to calculate the UE_ID that it provides to the eNB 108 to derive the paging occasion for the UE 104. Before the UE 104 initiates the TAU procedure, UE 104 also uses the prior Negotiated IMSI Offset value (or the IMSI value, if no IMSI offset has yet been negotiated) to calculate the UE_ID to derive the paging occasion. Upon sending the TRACKING AREA UPDATE REQUEST message, the UE 104 starts a timer T3430. Upon receiving the TRACKING AREA UPDATE REQUEST message, the MME 116 calculates a new Negotiated IMSI Offset (which may be the same as or different than the Requested IMSI Offset in the TRACKING AREA UPDATE REQUEST message). The MME 116 generates a TRACKING AREA UPDATE ACCEPT message that includes the new Negotiated IMSI Offset, and upon sending the TRACKING AREA UPDATE ACCEPT message, the MME 116 starts a timer T3450.

If the UE 104 receives the TRACKING AREA UPDATE ACCEPT message before the expiration of timer T3430, then it sends a TRACKING AREA UPDATE COMPLETE message. If the MME 116 receives the TRACKING AREA UPDATE COMPLETE message before the expiration of timer T3450, then the negotiation was successful. In this case, MME 116 uses the new Negotiated IMSI Offset value to calculate a new UE_ID and provide the new UE_ID to the eNB 108 to derive the paging occasion for the UE 104, and UE 104 also uses the new Negotiated IMSI Offset value to calculate a new UE_ID to derive the paging occasion. Using an Attach procedure instead of a TAU procedure to successfully exchange a Negotiated IMSI Offset value between MUSIM device 104 and MME 116 via eNB 108, and subsequent paging using paging occasions that are based on the new Negotiated IMSI Offset value, may be performed in an analogous manner.

As described in clause 4.3.33.5 of 3GPP TS 23.401 ("3rd Generation Partnership Project; Technical Specification Group Services and System Aspects; General Packet Radio Service (GPRS) enhancements for Evolved Universal Terrestrial Radio Access Network (E-UTRAN) access"), v17.1.0 (2021-06), the UE 104 and MME 116 may use the Negotiated IMSI Offset value to calculate an alternative IMSI value based on the IMSI of UE 104 as follows:

$$\text{alternative } IMSI \text{ value} = [\text{Mobile Country Code } (MCC)][\text{Mobile Network Code } (MNC)][(\text{Mobile Subscriber Identification Number } (MSIN) \text{ value} + \text{Negotiated } IMSI \text{ Offset}) \bmod (MSIN \text{ address space})]$$

where the MCC, MNC and MSIN value are the fields of the UE's IMSI as defined, for example, in clause 2.2 of 3GPP TS 23.003 ("3rd Generation Partnership Project; Technical Specification Group Core Network and Terminals; Numbering, addressing and identification"), v17.3.0 (2021-09)

Instead of the IMSI stored in the USIM, the UE 104 may use the alternative IMSI value computed as above for determination of paging occasions as described above. The MME 116 may use the alternative IMSI value computed as above instead of the UE's IMSI to compute the UE Identity Index value (UE_ID) that it sends to the eNB 108 (e.g., as described in clauses 9.1.6 and 9.2.3.10 of 3GPP TS 36.413 ("LTE; Evolved Universal Terrestrial Radio Access Network (E-UTRAN); S1 Application Protocol (S1AP)), v.16.6.0 (2021-08)) for the eNB 108 to derive the paging occasions as described above.

Clause 5.5.1 of 3GPP TS 24.501 ("3rd Generation Partnership Project; Technical Specification Group Core Network and Terminals; Non-Access-Stratum (NAS) protocol for 5G System (5GS); Stage 3"), v17.3.1 (2021-06), describes a Registration procedure that may be initiated by a UE with an AMF of a 5GC. For example, subclause 5.5.1.3.2 of 3GPP TS 24.501 specifies a Registration procedure for mobility and periodic registration update that is analogous to a TAU procedure as described in clause 5.5.3 of 3GPP TS 24.301, and subclause 5.5.1.2.2 of 3GPP TS 24.501 specifies a Registration procedure for initial registration that is analogous to an Attach procedure as described in clause 5.5.1 of 3GPP TS 24.301.

Figure 3:
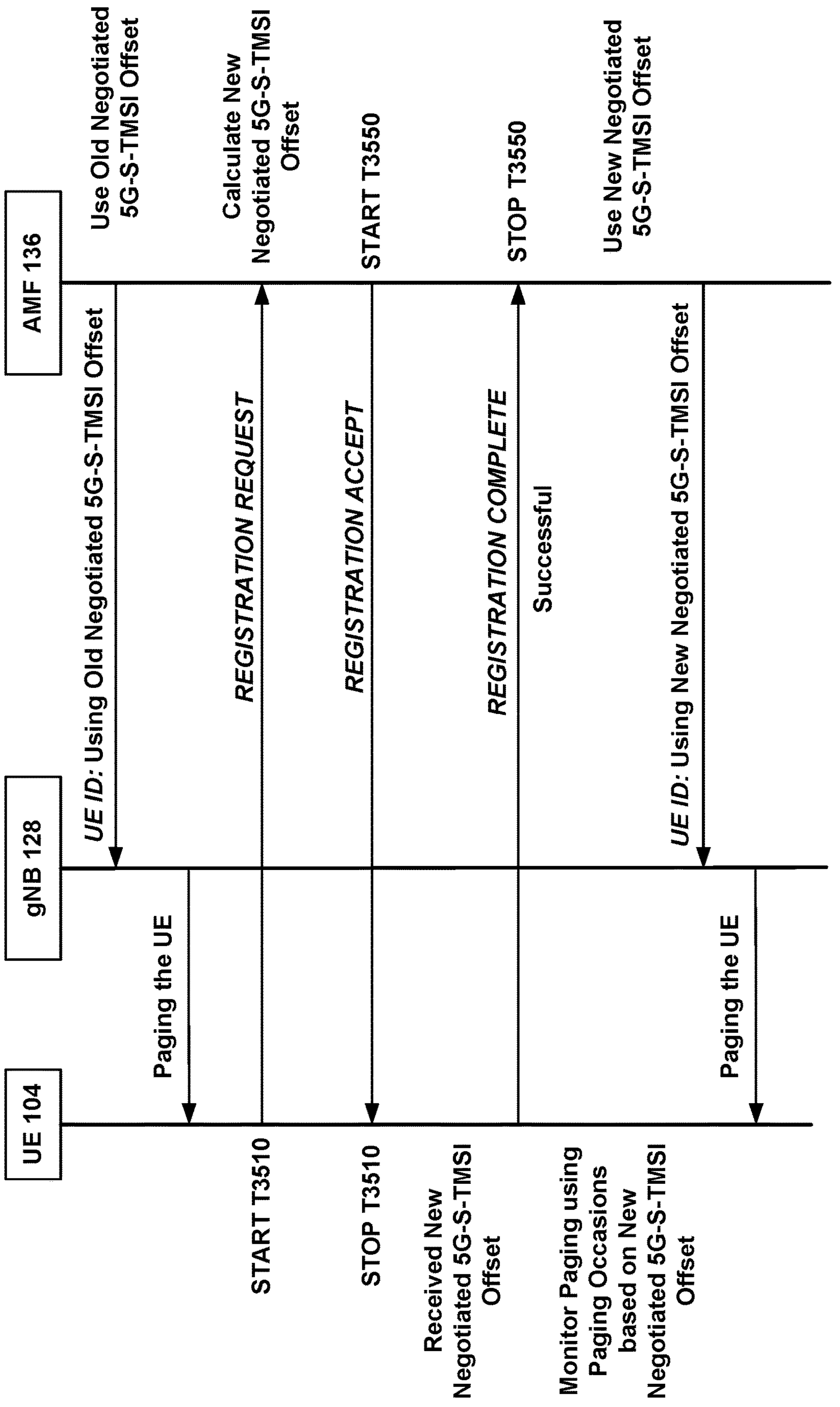
FIG. 3 shows an example of using a Registration procedure to exchange a Negotiated 5G-S-TMSI Offset value between a user equipment and a network according to some embodiments.

As noted above, the UE_ID in a 5GS is based on the UE's 5G-S-TMSI rather than the IMSI. It may be desired to allow the UE 104 and AMF 136 use a Negotiated 5G-S-TMSI Offset value to calculate an alternative 5G-S-TMSI value based on the 5G-S-TMSI of UE 104 (e.g., in a similar manner to calculation of an alternative IMSI value as described above). Similarly, it may be desired to expand a Registration procedure as described above to allow a MUSIM device, in a similar manner as described above with reference to FIG. 2, to initiate a negotiation with an AMF of a 5GC to request a such 5G-S-TMSI offset value. FIG. 3 shows one such example of using a Registration procedure (e.g., for mobility and periodic registration update) to successfully exchange a Negotiated 5G-S-TMSI Offset value between MUSIM device 104 and AMF 136 via gNB 128, and a subsequent switch to paging using paging occasions that are based on the new Negotiated 5G-S-TMSI Offset value.

In the example of FIG. 3, before the UE 104 initiates the Registration procedure, AMF 136 may use a prior Negotiated 5G-S-TMSI Offset value (or the 5G-S-TMSI value, if no 5G-S-TMSI offset has yet been negotiated) to calculate the UE_ID that it provides to the gNB 128 to derive the paging occasion for the UE 104, and UE 104 also uses the prior Negotiated 5G-S-TMSI Offset value (or the 5G-S-TMSI value, if no 5G-S-TMSI offset has yet been negotiated) to calculate the UE_ID to derive the paging occasion. Upon sending the REGISTRATION REQUEST message, the UE 104 starts a timer T3510. Upon receiving the REGISTRATION REQUEST message, the AMF 136 calculates a new Negotiated 5G-S-TMSI Offset (which may be the same as or different than the Requested 5G-S-TMSI Offset in the REGISTRATION REQUEST message). Upon sending the REGISTRATION ACCEPT message that includes the new Negotiated 5G-S-TMSI Offset, the AMF 136 starts a timer T3550.

If the UE 104 receives the REGISTRATION ACCEPT message before the expiration of timer T3510, then it sends the REGISTRATION COMPLETE message. If the AMF 136 receives the REGISTRATION COMPLETE message before the expiration of timer T3550, then the negotiation was successful. In this case, AMF 136 uses the new Negotiated 5G-S-TMSI Offset value to calculate a new UE_ID and provide the new UE_ID to the gNB 128 to derive the paging occasion for the UE 104, and UE 104 also uses the new Negotiated 5G-S-TMSI Offset value to calculate a new UE_ID to derive the paging occasion. Using a similarly expanded Registration procedure for initial registration to successfully exchange a Negotiated 5G-S-TMSI Offset value between MUSIM device 104 and AMF 136 via gNB 128, and subsequent paging using paging occasions that are based on the new Negotiated 5G-S-TMSI Offset value, may be performed in an analogous manner.

Clause 5.5.3.2.4 ("Normal and periodic tracking area updating procedure accepted by the network") of TS 24.301 specifies in part that:

"If a Negotiated IMSI offset IE is included in the TRACKING AREA UPDATE ACCEPT message, the MUSIM capable UE shall forward the IMSI offset value to lower layers. If a Negotiated IMSI offset IE is not included in the TRACKING AREA UPDATE ACCEPT message, the MUSIM capable UE shall indicate to lower layers to erase any IMSI offset value, if available . . . . If the TRACKING AREA UPDATE ACCEPT message contained a GUTI [Globally Unique Temporary Identifier] or a Negotiated IMSI offset IE, the UE shall return a TRACKING AREA UPDATE COMPLETE message to the MME to acknowledge the received GUTI or the received Negotiated IMSI offset IE."

As described above, success of a negotiation as shown in FIG. 2 depends, for example, upon receipt of the TRACKING AREA UPDATE COMPLETE message by MME 116 before the expiration of timer T3450. A lower layer failure (e.g., a failure at the access stratum (AS) level) may prevent successful transmission of the TRACKING AREA UPDATE COMPLETE message. Lower layer failure may occur before the TRACKING AREA UPDATE COMPLETE message is received by the MME, and this failure may cause an uncertainty at the network side as to which (Negotiated) IMSI value is currently used by the UE. If the network does not receive the TRACKING AREA UPDATE COMPLETE message successfully, there can be three possible cases at the UE:

1) The UE may have no negotiated IMSI offset value. For example, the UE may have only the original IMSI value, and the network may have been trying to give it a new negotiated IMSI offset value in the TRACKING AREA UPDATE ACCEPT message.
2) The UE may have already had an old negotiated IMSI offset value, and the network may have been trying to give it a new negotiated IMSI offset value in the TRACKING AREA UPDATE ACCEPT message.
3) The UE may have already had an old negotiated IMSI offset value, and the network may have sent the TRACKING AREA UPDATE ACCEPT message without including any new negotiated IMSI offset value (e.g., the old negotiated IMSI offset value, or no offset value at all).

It may be desired to provide an effective technique for handling a Negotiated IMSI Offset value during lower layer failures. Given a lower-layer failure scenario as described above, for example, it may be desired to enable the network to determine how to page the UE in this scenario; to determine how the UE and network may recover from this scenario and arrive at a common Negotiated IMSI Offset value; to handle such recovery in a power-efficient manner so that the UE does not waste battery power in monitoring multiple paging occasions; and/or to minimize additional signaling impacts on the network entities (e.g., UE, MME, eNB, AMF, and/or gNB) such that the recovery may be handled in an efficient manner. It may also be desired to extend such a technique to 5GS and NR. Additionally or alternatively, it may be desired to provide a technique for handling a Negotiated IMSI Offset value during lower layer failures that may be used to take advantage of additional power savings by paging sub-groupings.

In the failure scenario described above, the UE tries to respond to the TRACKING AREA UPDATE ACCEPT message by sending a TRACKING AREA UPDATE COMPLETE message. Due to a lower layer failure, however, the UE does not receive a Radio Link Control (RLC) acknowledgment (ACK). Consequently, the UE knows that the TRACKING AREA UPDATE COMPLETE message was not delivered to the network. For the case of a "[t]ransmission failure of TRACKING AREA UPDATE COMPLETE message indication without [Tracking Area Identity (TAI)] change from lower layers," sub-clause (j) of clause 5.5.3.2.6 ("Abnormal cases in the UE") of 3GPP TS 24.301 specifies only that "[i]t is up to the UE implementation how to re-run the ongoing procedure." For the case of a "[t]ransmission failure of TRACKING AREA UPDATE COMPLETE message indication with TAI change from lower layers," sub-clause (i) of clause 5.5.3.2.6 of 3GPP TS 24.301 specifies only that "[i]f the current TAI is not in the TAI list, the tracking area updating procedure shall be aborted and re-initiated immediately. The UE shall set the EPS update status to EU2 NOT UPDATED" and "[i]f the current TAI is still part of the TAI list, it is up to the UE implementation how to re-run the ongoing procedure." Such specifications fail to resolve an uncertainty as to which offset value should be used after the failure.

Because the network does not receive the TRACKING AREA UPDATE COMPLETE message (e.g., due to a lower layer failure), timer T3450 expires on the network side (e.g., at the MME). In response to the expiration of timer T3450, the network aborts the TAU procedure and enters idle mode. Although the network knows that it did not receive the TRACKING AREA UPDATE COMPLETE message, it is uncertain at the network side whether the UE received the Negotiated IMSI offset in the TRACKING AREA UPDATE ACCEPT message or not. Accordingly, the handshaking failed, and dissemination of the new Negotiated IMSI offset was not completed successfully.

Figure 4:
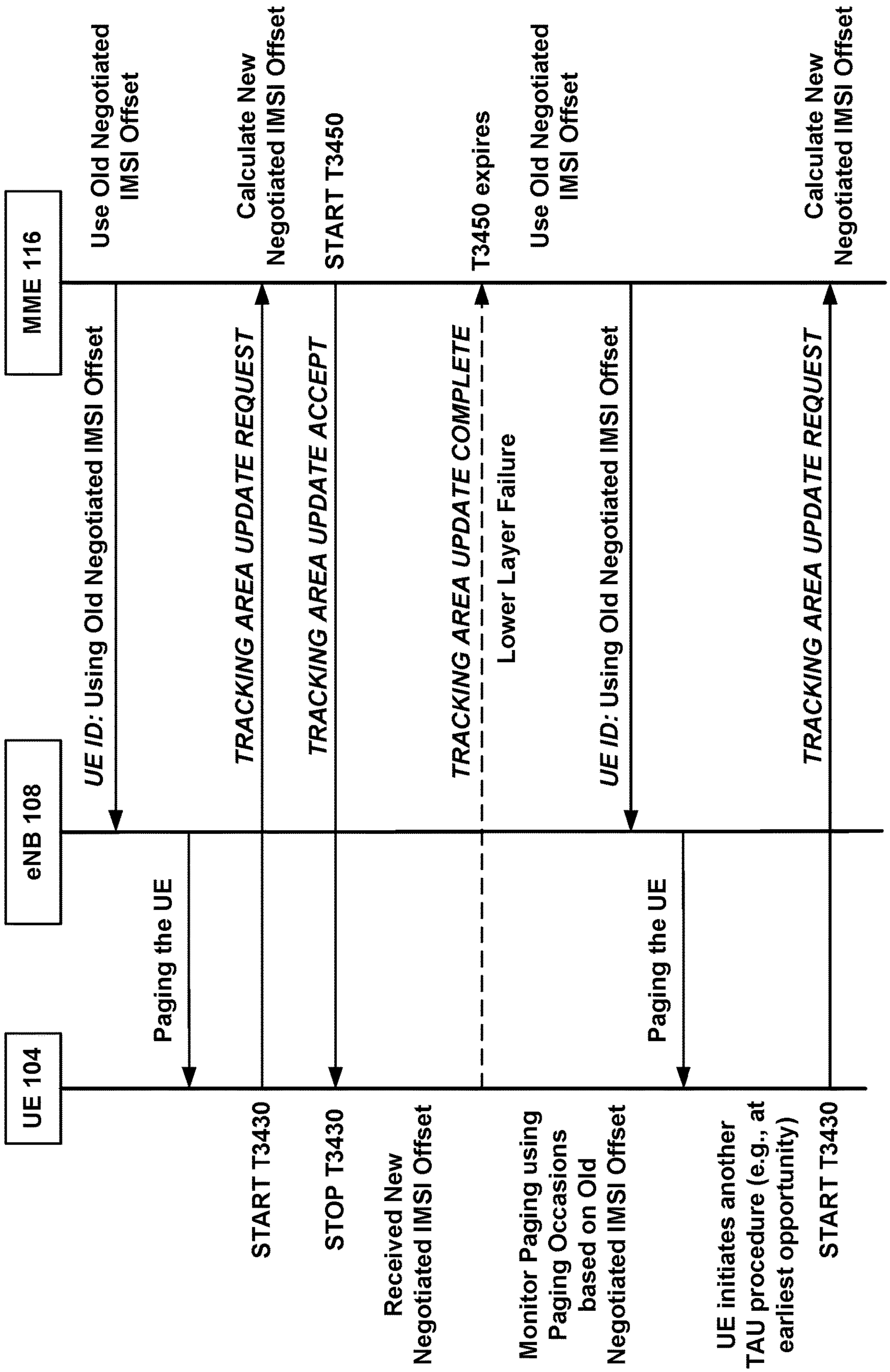
FIG. 4 shows a technique for handling a failed exchange of a Negotiated IMSI Offset between a user equipment and an MME according to some embodiments.

FIG. 4 shows a technique for handling a failed exchange of a Negotiated IMSI Offset between a MUSIM device and an MME (e.g., due to a lower layer failure) according to some embodiments. As in the example of FIG. 2, the UE 104 initiates a TAU procedure by sending a TRACKING AREA UPDATE REQUEST message that includes a Requested IMSI offset to the MME 116. The Requested IMSI offset may be selected (e.g., by the UE 104) from among a predetermined set of offset values, which may be provided to the UE 104 by the MME 116. Additionally or alternatively, the Requested IMSI offset may be selected (e.g., by the UE 104) from a predetermined range of offset values. Such a range may be indicated, for example, by a maximum offset value, which may be provided to the UE 104 by the MME 116.

In response to the TRACKING AREA UPDATE REQUEST message, the MME 116 sends a TRACKING AREA UPDATE ACCEPT message that includes a Negotiated IMSI offset to the UE and stores the Negotiated IMSI Offset in the UE Context. The Negotiated IMSI offset may have the same value as the Requested IMSI offset, or the Negotiated IMSI offset may have a different value than the Requested IMSI offset. The Negotiated IMSI offset may be selected (e.g., by the MME 116) from among a predetermined set of offset values, which may be provided to the MME 116 by the UE 104. Additionally or alternatively, the Negotiated IMSI offset may be selected (e.g., by the MME 116) from a predetermined range of offset values. Such a range may be indicated, for example, by a maximum offset value, which may be provided to the MME 116 by the UE 104.

In response to the TRACKING AREA UPDATE ACCEPT message, the UE sends a TRACKING AREA UPDATE COMPLETE message to the MME 116. In this case, however, the MME 116 does not receive the TRACKING AREA UPDATE COMPLETE message (e.g., due to a lower layer failure). Therefore, the network proceeds to page the UE 104 only with the previous old Negotiated IMSI offset value (e.g., the network continues to use the old paging occasions). In other words, the network does not use the new Negotiated IMSI offset that was sent in the last TRACKING AREA UPDATE ACCEPT message. If the paging is successful (e.g., the UE responds to the page), UE can initiate a new TAU procedure thereafter. If the paging is unsuccessful (e.g., the UE does not respond to the page), the network can initiate a deregistration procedure and cause the UE to Attach again. According to this technique, the MME 116 switches to the new Negotiated IMSI offset to calculate a new UE_ID and paging occasion (and communicates the new UE_ID to eNB 108) only if the TAU procedure completes successfully.

At the UE side, the UE 104 is aware that an error has occurred because it has not received an RLC ACK from the lower layer in response to the TRACKING AREA UPDATE COMPLETE message. Failure to receive the RLC ACK may be indicated, for example, by expiration of a timer (e.g., a timer started by the UE upon sending the TRACKING AREA UPDATE COMPLETE message to a lower layer). However, the UE 104 is uncertain as to whether the network has received the TRACKING AREA UPDATE COMPLETE message or not. Since the UE is aware of the error, it continues to monitor a paging occasion that is derived using the old Negotiated IMSI offset only (e.g., the UE does not use the new Negotiated IMSI offset received in the TRACKING AREA UPDATE ACCEPT message to derive a new paging occasion). The UE may initiate a new TAU procedure with TRACKING AREA UPDATE REQUEST message, or the UE may even try a new attach with an ATTACH REQUEST message. According to this technique, the UE 104 switches to the new Negotiated IMSI offset to calculate a new UE_ID and paging occasion only if the TAU procedure completes successfully. It may be desired for the UE to try to establish a Negotiated IMSI offset by immediately initiating a new TAU procedure (e.g., at a first available opportunity).

One alternate to a technique as shown in FIG. 4 involves the use of multiple paging occasions per DRX cycle for a USIM of a MUSIM device. In this alternate scenario, the network switches to the new Negotiated IMSI offset. If the UE has successfully received the new Negotiated IMSI offset, the UE also switches to the new Negotiated IMSI offset; otherwise the UE continues to use the old Negotiated IMSI offset. The next time that the network needs to page the UE, the network first pages the UE within a paging occasion as determined using a UE_ID that is based on the new Negotiated IMSI offset. If the paging is successful (e.g., if the UE responds to the MME), the network will discard the old Negotiated IMSI offset value. Otherwise, if the UE does not respond to the page, the network may page the UE again within a different paging occasion, as determined using a UE_ID that is based on the old Negotiated IMSI offset value, and the network may discard the new Negotiated IMSI offset value.

As compared to a technique as shown in FIG. 4, this alternate scenario lacks a clear mechanism as to when one of the UE_IDs is discarded and as to which one of the UE_IDs is adopted. As a result, the UE may easily miss pages, which may lead to a bad user experience (e.g., depending on service type and type of data). Monitoring multiple paging occasions per DRX cycle may be inefficient and battery-intensive for the UE and may cause increased paging signaling load on the air interface, delay in service setup (e.g., due to potential dual paging delay), and/or increased idle wakeup duration on the UE (which may adversely impact the UE's power performance).

In contrast to the alternate scenario described above, a technique as described with reference to FIG. 4 allows both the UE and the network to behave deterministically by using the old Negotiated IMSI offset value, and paging messages can be delivered in spite of errors that may occur during offset negotiation. The network is not required to switch from one UE_ID to another to page the same UE, this avoiding potential delays in paging delivery. The UE is not required to switch from one UE_ID to another, which may be beneficial as the UE does not know when it may be necessary to perform such a switch.

A technique as described with reference to FIG. 4 may also be advantageous with respect to paging subgrouping. For example, it may be desired to group UEs that share a paging occasion into multiple subgroups. Such subgrouping may reduce paging false alarms, thereby leading to additional UE power savings. The subgrouping may be controlled by the network (e.g., based on individual UE characteristics). A configuration option may also be provided in which subgrouping can be supported by randomization (e.g., by UE_ID), in case the network chooses to not provide specific subgrouping information. Further, the core network (CN) may be responsible for allocating UEs to UE paging subgroups based on UE characteristics. It may be desired to use the same subgroup for a UE when the UE is in RRC_IDLE state as when the UE is in RRC_INACTIVE state.

Use of a recovery technique that involves changing paging occasion by using multiple UE_IDs at the same time, as in the alternate scenario described above, may be expected to reduce the efficiency of a paging subgrouping implementation and result in loss of power savings. However, use of a technique as described with reference to FIG. 4 may be expected to maintain the additional UE power savings that may be realized by the use of paging subgrouping.

A technique as described above with reference to FIG. 4 may also be extended to NR and 5GS. For example, such a technique may be used to avoid an NR paging collision when using NAS-based 5G S-TMSI reassignment, where the same failure scenario (e.g., transmission failure of the Complete message) may occur. According to this technique, the NR UE may continue to listen to the old paging configuration until all signaling message exchanges for the paging collision resolution between the UE and the network have been completed successfully. The UE may further re-trigger the NAS procedure, in case of unsuccessful completion, in order to re-establish the new Negotiated values. If multiple such retries also fail, the UE may re-initiate the full procedure all over again (e.g., in order to resolve the original issue of paging collision).

Figure 5:
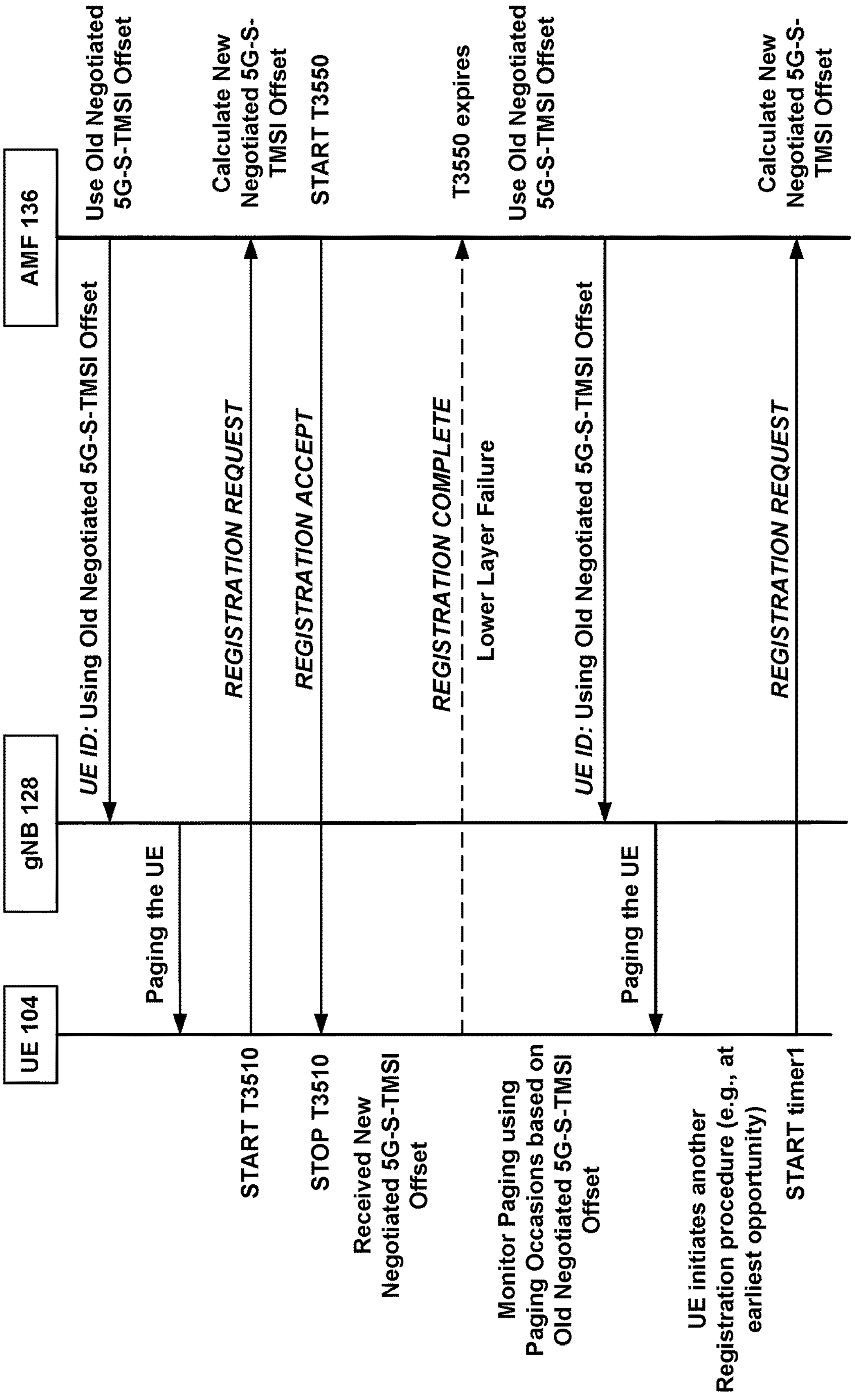
FIG. 5 shows a technique for handling a failed exchange of a Negotiated 5G-S-TMSI Offset between a user equipment and an AMF according to some embodiments.

FIG. 5 shows a technique for handling a failed exchange of a Negotiated 5G-S-TMSI Offset between a MUSIM device and an AMF (e.g., due to a lower layer failure) according to some embodiments. As in the example of FIG. 3, the UE 104 initiates a Registration procedure (e.g., for mobility and periodic registration update) by sending a REGISTRATION REQUEST message that includes a Requested 5G-S-TMSI offset to the AMF 136. The Requested 5G-S-TMSI offset may be selected (e.g., by the UE 104) from among a predetermined set of offset values, which may be provided to the UE 104 by the AMF 136. Additionally or alternatively, the Requested 5G-S-TMSI offset may be selected (e.g., by the UE 104) from a predetermined range of offset values. Such a range may be indicated, for example, by a maximum offset value, which may be provided to the UE 104 by the AMF 136.

In response to the REGISTRATION REQUEST message, the AMF 136 sends a REGISTRATION ACCEPT message that includes a Negotiated 5G-S-TMSI offset to the UE and stores the Negotiated 5G-S-TMSI Offset in the UE Context. The Negotiated 5G-S-TMSI offset may have the same value as the Requested 5G-S-TMSI offset, or the Negotiated 5G-S-TMSI offset may have a different value than the Requested 5G-S-TMSI offset. The Negotiated 5G-S-TMSI offset may be selected (e.g., by the AMF 136) from among a predetermined set of offset values, which may be provided to the AMF 136 by the UE 104. Additionally or alternatively, the Negotiated 5G-S-TMSI offset may be selected (e.g., by the AMF 136) from a predetermined range of offset values. Such a range may be indicated, for example, by a maximum offset value, which may be provided to the AMF 136 by the UE 104.

In response to the REGISTRATION ACCEPT message, the UE sends a REGISTRATION COMPLETE message to the AMF 136. In this case, however, the AMF 136 does not receive the REGISTRATION COMPLETE message (e.g., due to a lower layer failure). Therefore, the network proceeds to page the UE 104 only with the previous old Negotiated 5G-S-TMSI offset value (e.g., the network continues to use the old paging occasions). In other words, the network does not use the new Negotiated 5G-S-TMSI offset that was sent in the last REGISTRATION ACCEPT message. If the paging is successful (e.g., the UE responds to the page), the UE can initiate a new Registration procedure (e.g., for mobility and periodic registration update) thereafter. If the paging is unsuccessful (e.g., the UE does not respond to the page), the network can initiate a deregistration procedure and cause the UE to initiate a new Registration procedure (e.g., for initial registration). According to this technique, the AMF 136 switches to the new Negotiated 5G-S-TMSI offset to calculate a new UE_ID and paging occasion (and communicates the new UE_ID to gNB 128) only if the Registration procedure completes successfully.

At the UE side, the UE 104 is aware that an error has occurred because it has not received an RLC ACK from the lower layer in response to the REGISTRATION COMPLETE message. However, the UE 104 is uncertain as to whether the network has received the REGISTRATION COMPLETE message or not. Since the UE is aware of the error, it continues to monitor a paging occasion that is derived using the old Negotiated 5G-S-TMSI offset only (e.g., the UE does not use the new Negotiated 5G-S-TMSI offset received in the REGISTRATION ACCEPT message to derive a new paging occasion). The UE may initiate a new Registration procedure with a REGISTRATION REQUEST message for mobility and periodic registration update, or the UE may even try a new Registration procedure with a REGISTRATION REQUEST message for initial registration. According to this technique, the UE 104 switches to the new Negotiated 5G-S-TMSI offset to calculate a new UE_ID and paging occasion only if the Registration procedure completes successfully. It may be desired for the UE to try to establish a Negotiated 5G-S-TMSI offset by immediately initiating a new Registration procedure (e.g., at a first available opportunity).

In the scenario described above with reference to FIG. 4, the MME 116 does not receive the TRACKING AREA UPDATE COMPLETE message, and it is assumed that the UE 104 is aware that an error has occurred because it does not receive an RLC ACK from the lower layer in response to the TRACKING AREA UPDATE COMPLETE message. In some cases, however, the UE 104 may be unaware that an error has occurred. For example, the UE 104 may receive the RLC ACK from the lower layer in response to the TRACKING AREA UPDATE COMPLETE message even if the TRACKING AREA UPDATE COMPLETE message is lost between the eNB 108 and the MME 116, so that the UE 104 may be unaware that an error has occurred. In other cases, the UE 104 may be unaware that the MME 116 has received the TRACKING AREA UPDATE COMPLETE message. For example, the eNB 108 may fail to deliver the RLC ACK to the UE 104 even if the TRACKING AREA UPDATE COMPLETE message has been delivered successfully to the MME 116, so that the UE 104 is unaware of the successful delivery. In order to handle one or more such error cases as well, one or more other approaches may be desired.

Figure 6:
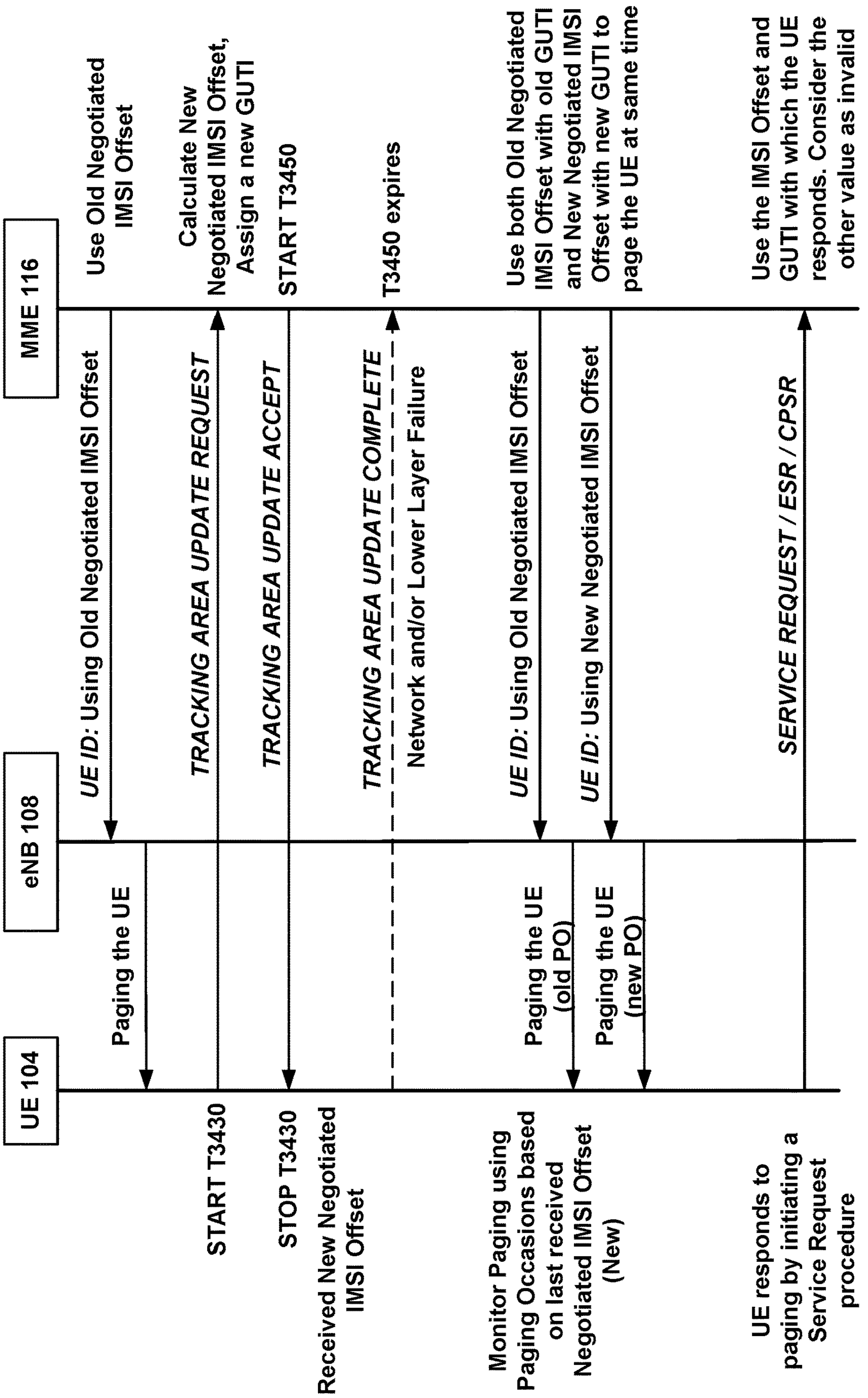
FIG. 6 shows another technique for handling a failed exchange of a Negotiated IMSI Offset between a user equipment and an MME according to some embodiments.

FIG. 6 shows another technique for handling a failed exchange of a Negotiated IMSI Offset between a MUSIM device and an MME (e.g., due to a network failure and/or a lower layer failure) according to some embodiments. As in the example of FIG. 2, the UE 104 initiates a TAU procedure by sending a TRACKING AREA UPDATE REQUEST message that includes a Requested IMSI offset to the MME 116. The Requested IMSI offset may be selected (e.g., by the UE 104) from among a predetermined set of offset values, which may be provided to the UE 104 by the MME 116. Additionally or alternatively, the Requested IMSI offset may be selected (e.g., by the UE 104) from a predetermined range of offset values. Such a range may be indicated, for example, by a maximum offset value, which may be provided to the UE 104 by the MME 116.

In response to the TRACKING AREA UPDATE REQUEST message, the MME 116 sends a TRACKING AREA UPDATE ACCEPT message that includes a Negotiated IMSI offset to the UE and stores the Negotiated IMSI Offset in the UE Context. The Negotiated IMSI offset may have the same value as the Requested IMSI offset, or the Negotiated IMSI offset may have a different value than the Requested IMSI offset. The Negotiated IMSI offset may be selected (e.g., by the MME 116) from among a predetermined set of offset values, which may be provided to the MME 116 by the UE 104. Additionally or alternatively, the Negotiated IMSI offset may be selected (e.g., by the MME 116) from a predetermined range of offset values. Such a range may be indicated, for example, by a maximum offset value, which may be provided to the MME 116 by the UE 104. In this case, the MME 116 also allocates (e.g., assigns) a new GUTI to the UE 104 and includes the new GUTI in the TRACKING AREA UPDATE ACCEPT message.

In response to the TRACKING AREA UPDATE ACCEPT message, the UE 104 sends a TRACKING AREA UPDATE COMPLETE message to the MME 116 and also begins to use the new GUTI in subsequent communications with the network. In this example, however, the MME 116 does not receive the TRACKING AREA UPDATE COMPLETE message before the expiration of timer T3450 (e.g., the TRACKING AREA UPDATE COMPLETE message is lost between the UE 104 and the eNB 108, or the TRACKING AREA UPDATE COMPLETE message is lost between the eNB 108 and the MME 116), and the UE 104 may or may not be aware that the error has occurred.

Therefore, the network proceeds to page the UE 104 with the previous old Negotiated IMSI offset value (e.g., the network continues to use the old paging occasions) and, at the same time (e.g., within the same DRX cycle or paging cycle of the UE 104), the network proceeds to page the UE 104 with the new Negotiated IMSI offset that was sent in the last TRACKING AREA UPDATE ACCEPT message (e.g., the network also uses new paging occasions). If the UE successfully received the TRACKING AREA UPDATE ACCEPT message (as in the example of FIG. 6), then the UE 104 responds to the paging that is based on the new Negotiated IMSI offset value by initiating a Service Request procedure (e.g., by sending a SERVICE REQUEST (SR) message, an EXTENDED SERVICE REQUEST (ESR) message, or a CONTROL PLANE SERVICE REQUEST (CPSR) message) using the new GUTI. For example, the SR, ESR, or CPSR message may include a System Architecture Evolution-Temporary Mobile Subscriber Identity (S-TMSI) that is based on the new GUTI. Alternatively, if the UE 104 did not receive the TRACKING AREA UPDATE ACCEPT message before the expiration of timer T3430, then the UE 104 responds to the paging that is based on the old Negotiated IMSI offset value by initiating a Service Request procedure using the old GUTI. For example, the SR, ESR, or CPSR message may include an S-TMSI that is based on the old GUTI. Upon receiving the response of UE 104 to the page (e.g., the SR, ESR, or CPSR message), the network proceeds to use the IMSI offset and GUTI indicated by the response (e.g., to communicate with the UE and/or with the eNB regarding the UE). For example, one among the old and new Negotiated IMSI offset values may be indicated by UE identity information (e.g., the old or new GUTI, or an S-TMSI that is based on the old GUTI or on the new GUTI) in the SR, ESR, or CPSR message. For a case in which the UE 104 does not receive the TRACKING AREA UPDATE ACCEPT message before the expiration of timer T3430, it may be desired for the UE to try to establish a Negotiated IMSI offset by immediately initiating a new TRACKING AREA UPDATE procedure (e.g., at a first available opportunity).

A technique as described with reference to FIG. 6 allows the network to avoid a delay in delivering the page to the UE 104 in a deterministic manner, as the network pages the UE 104 at the same time (e.g., during the same paging cycle of the UE) with both the old and new IMSI offset and GUTI values. Depending on how the UE 104 responds, the appropriate IMSI Offset and GUTI value is selected. No change in behavior is required on the UE side, and UE 104 may continue to monitor only one paging occasion per paging cycle per USIM even in case of error during IMSI offset negotiation. No delay is incurred in setting up the service (e.g., unlike a case in which the UE is paged first with one value and, if the UE does not respond, the UE is then paged with another value). Use of a technique as described with reference to FIG. 6 may also be expected to maintain the additional UE power savings that may be realized by the use of paging subgrouping as described above.

A technique as described above with reference to FIG. 6 may also be extended to NR and 5GS. For example, such a technique may be used to avoid an NR paging collision when using NAS-based 5G S-TMSI reassignment, where the same failure scenario (e.g., transmission failure of the Complete message) may occur.

Figure 7:
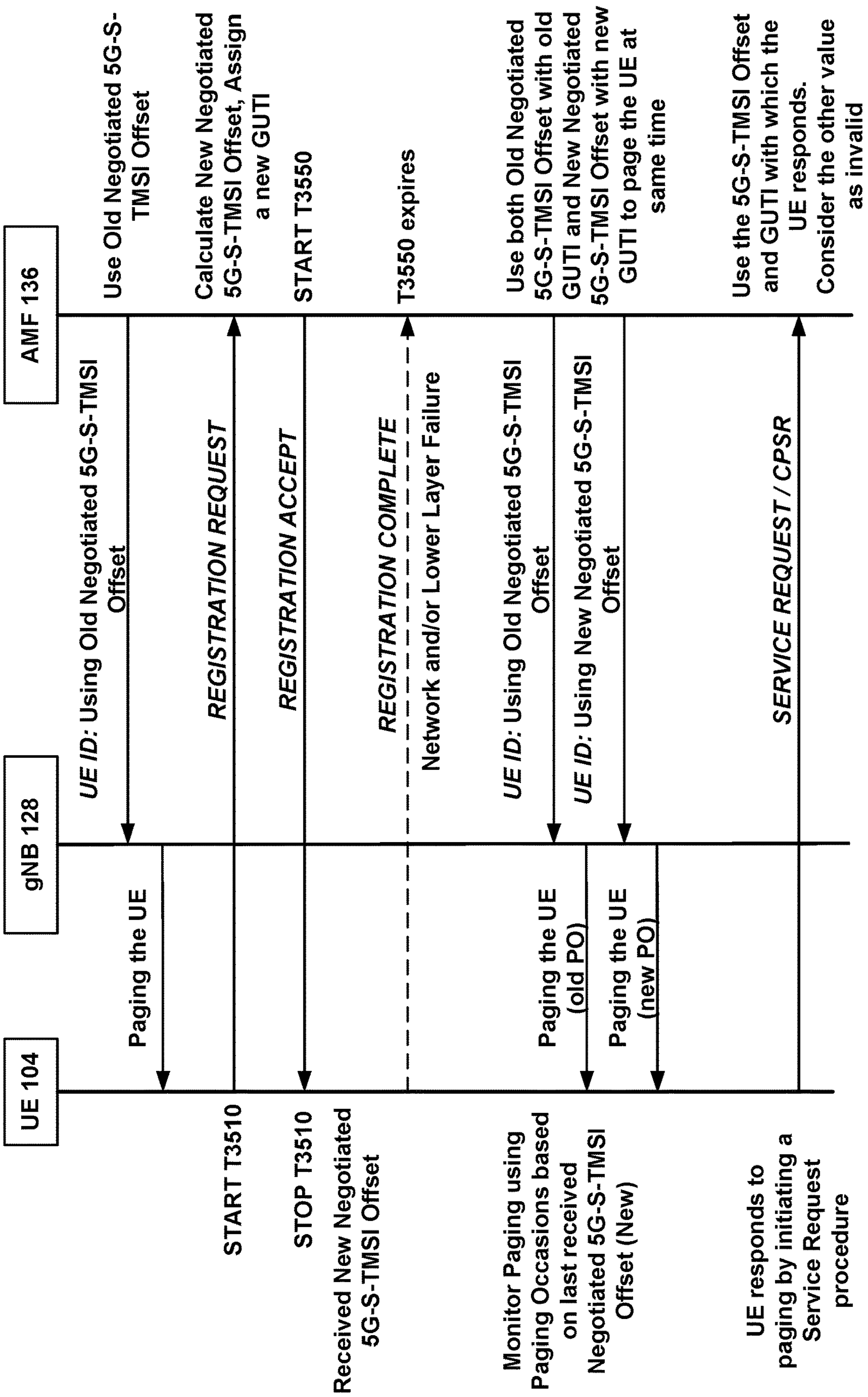
FIG. 7 shows another technique for handling a failed exchange of a Negotiated 5G-S-TMSI Offset between a user equipment and an AMF according to some embodiments.

FIG. 7 shows another technique for handling a failed exchange of a Negotiated 5G-S-TMSI Offset between a MUSIM device and an AMF (e.g., due to a network failure and/or a lower layer failure) according to some embodiments. As in the example of FIG. 3, the UE 104 initiates a Registration procedure (e.g., for mobility and periodic registration update) by sending a REGISTRATION REQUEST message that includes a Requested 5G-S-TMSI offset to the AMF 136. The Requested 5G-S-TMSI offset may be selected (e.g., by the UE 104) from among a predetermined set of offset values, which may be provided to the UE 104 by the AMF 136. Additionally or alternatively, the Requested 5G-S-TMSI offset may be selected (e.g., by the UE 104) from a predetermined range of offset values. Such a range may be indicated, for example, by a maximum offset value, which may be provided to the UE 104 by the AMF 136.

In response to the REGISTRATION REQUEST message, the AMF 136 sends a REGISTRATION ACCEPT message that includes a Negotiated 5G-S-TMSI offset to the UE and stores the Negotiated 5G-S-TMSI Offset in the UE Context. The Negotiated 5G-S-TMSI offset may have the same value as the Requested 5G-S-TMSI offset, or the Negotiated 5G-S-TMSI offset may have a different value than the Requested 5G-S-TMSI offset. The Negotiated 5G-S-TMSI offset may be selected (e.g., by the AMF 136) from among a predetermined set of offset values, which may be provided to the AMF 136 by the UE 104. Additionally or alternatively, the Negotiated 5G-S-TMSI offset may be selected (e.g., by the AMF 136) from a predetermined range of offset values. Such a range may be indicated, for example, by a maximum offset value, which may be provided to the AMF 136 by the UE 104. In this case, the AMF 136 also allocates (e.g., assigns) a new GUTI to the UE 104 and includes the new GUTI in the REGISTRATION ACCEPT message.

In response to the REGISTRATION ACCEPT message, the UE sends a REGISTRATION COMPLETE message to the AMF 136 and also begins to use the new GUTI in subsequent communications with the network. In this case, however, the AMF 136 does not receive the REGISTRATION COMPLETE message before the expiration of timer T3550 (e.g., the REGISTRATION COMPLETE message is lost between the UE 104 and the gNB 128, or the REGISTRATION COMPLETE message is lost between the gNB 128 and the AMF 136), and the UE 104 may or may not be aware that the error has occurred.

Therefore, the network proceeds to page the UE 104 with the previous old Negotiated 5G-S-TMSI offset value (e.g., the network continues to use the old paging occasions) and, at the same time (e.g., within the same DRX cycle or paging cycle of the UE 104), the network proceeds to page the UE 104 with the new Negotiated 5G-S-TMSI offset that was sent in the last REGISTRATION ACCEPT message (e.g., the network also uses new paging occasions). If the UE successfully received the REGISTRATION ACCEPT message (as in the example of FIG. 7), then the UE 104 responds to the paging that is based on the new Negotiated IMSI offset value by initiating a Service Request procedure (e.g., by sending a SERVICE REQUEST (SR) message or a CONTROL PLANE SERVICE REQUEST (CPSR) message) using the new GUTI. For example, the SR or CPSR message may include a 5G-S-Temporary Mobile Subscriber Identity (5G-S-TMSI) that is based on the new GUTI. Alternatively, if the UE 104 did not receive the REGISTRATION ACCEPT message before the expiration of timer T3510, then the UE 104 responds to the paging that is based on the old Negotiated IMSI offset value by initiating a Service Request procedure using the old GUTI. For example, the SR or CPSR message may include a 5G-S-TMSI that is based on the old GUTI. Upon receiving the response of UE 104 to the page (e.g., the SR or CPSR message), the network proceeds to use the 5G-S-TMSI offset and GUTI indicated by the response (e.g., to communicate with the UE and/or with the gNB regarding the UE). For example, one among the old and new Negotiated 5G-S-TMSI offset values may be indicated by UE identity information (e.g., the old or new GUTI, or an S-TMSI that is based on the old GUTI or on the new GUTI) in the SR or CPSR message. For a case in which the UE 104 does not receive the REGISTRATION ACCEPT message before the expiration of timer T3510, it may be desired for the UE to try to establish a Negotiated 5G-S-TMSI offset by immediately initiating a new REGISTRATION UPDATE procedure (e.g., at a first available opportunity).

Figure 8:
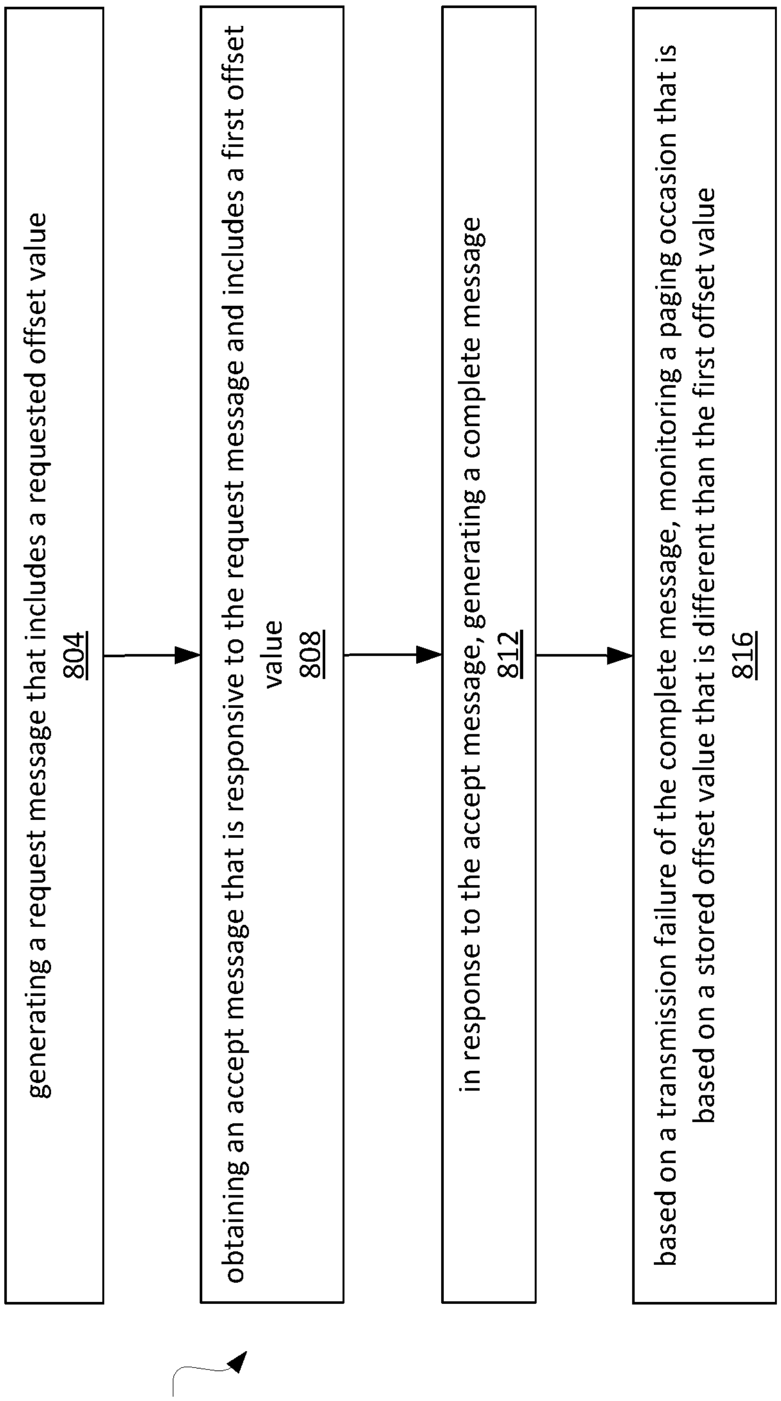
FIG. 8 illustrates an operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1200; or components thereof, for example, baseband processor 1204A.

The operation flow/algorithmic structure 800 may include, at 804, generating a request message that includes a requested offset value. The request message may be, for example, one of an ATTACH REQUEST message and a Tracking Area Update Request message. The request message may be, for example, a REGISTRATION REQUEST message, which may indicate a request to update a registration. The requested offset value may be, for example, an IMSI offset value or a 5G-S-TMSI offset value.

The operation flow/algorithmic structure 800 may include, at 808, obtaining an accept message that is responsive to the request message and includes a first offset value. The first offset value may be the same as the requested offset value. Alternatively, the first offset value may be different than the requested offset value. The first offset value may be, for example, a negotiated offset value (e.g., a negotiated IMSI offset value or a negotiated 5G-S-TMSI offset value).

The operation flow/algorithmic structure 800 may include, at 812, in response to the accept message, generating a complete message.

The operation flow/algorithmic structure 800 may include, at 816, based on a transmission failure of the complete message, monitoring a paging occasion that is based on a stored offset value that is different than the first offset value. For example, the operation flow/algorithmic structure 800 may include starting a timer upon a sending of the complete message, and expiration of the timer may indicate the transmission failure of the complete message. Additionally or alternatively, lack of an acknowledgement of transmission of the complete message by a lower layer may indicate the transmission failure of the complete message. The stored offset value may be a negotiated offset value (e.g., another negotiated IMSI offset value or another negotiated 5G-S-TMSI offset value).

The operation flow/algorithmic structure 800 may further include, based on the transmission failure of the complete message, generating a second update request that includes a second requested offset value. The second requested offset value may be the same as the requested offset value. Alternatively, the second requested offset value may be different than the requested offset value. The second requested offset value may be, for example, a second requested IMSI offset value or a second requested 5G-S-TMSI offset value.

Figure 9:
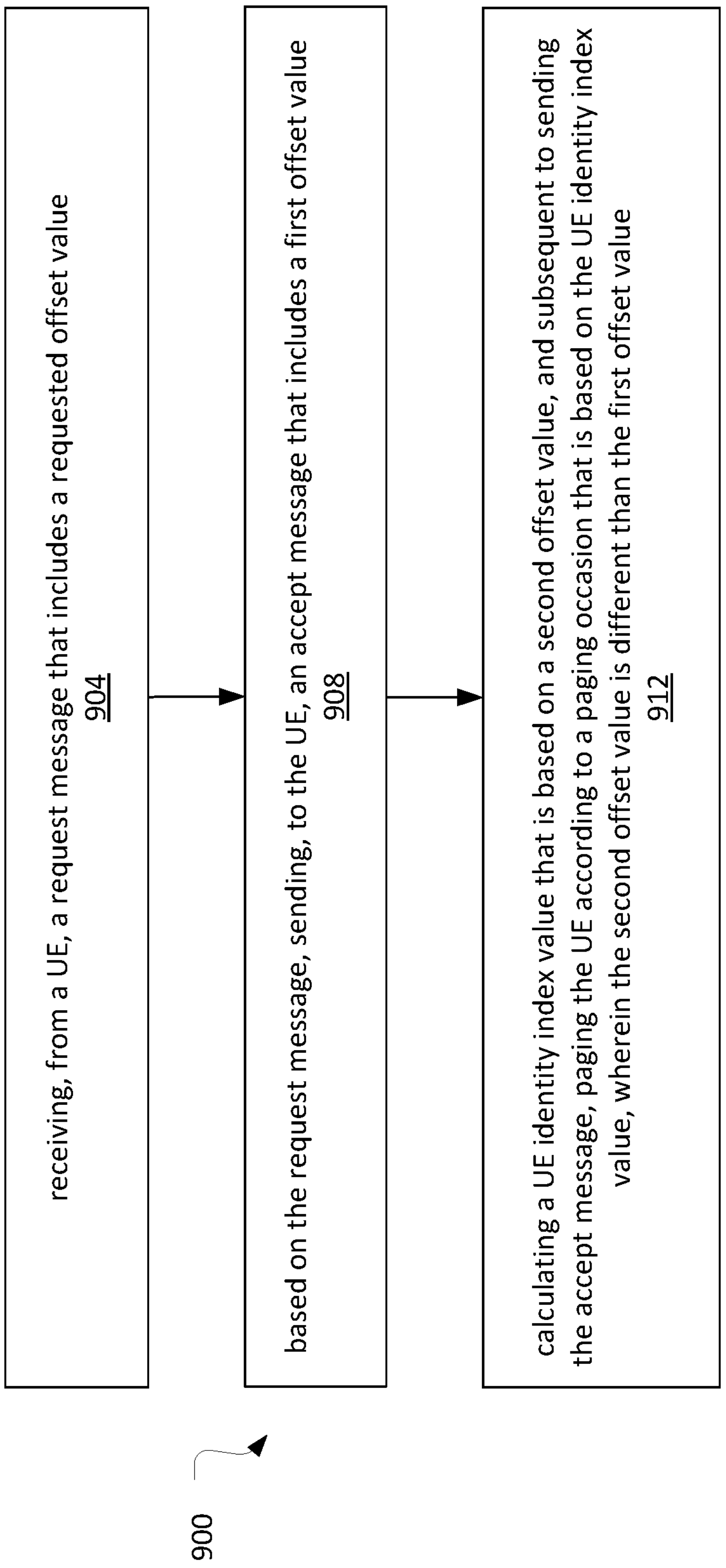
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a network element such as, for example, MME 116 or AMF 136; or components thereof, for example, one or more processors.

The operation flow/algorithmic structure 900 may include, at 904, receiving, from a UE, a request message that includes a requested offset value. The request message may be, for example, one of an ATTACH REQUEST message and a TRACKING AREA UPDATE REQUEST message. The request message may be, for example, a REGISTRATION REQUEST message, which may indicate a request to update a registration. The requested offset value may be, for example, an IMSI offset value or a 5G-S-TMSI offset value.

The operation flow/algorithmic structure 900 may include, at 908, based on the request message, sending, to the UE, an accept message that includes a first offset value. The first offset value may be the same as the requested offset value. Alternatively, the first offset value may be different than the requested offset value. The first offset value may be, for example, a negotiated offset value (e.g., a negotiated IMSI offset value or a negotiated 5G-S-TMSI offset value).

The operation flow/algorithmic structure 900 may include, at 912, calculating a UE identity index value that is based on a second offset value, and subsequent to sending the accept message, paging the UE according to a paging occasion that is based on the UE identity value, wherein the second offset value is different than the first offset value. The UE identity index value may be, for example, a UE_ID. The second offset value may be, for example, a negotiated offset value (e.g., another negotiated IMSI offset value or another negotiated 5G-S-TMSI offset value). The operation flow/algorithmic structure 900 may include using the UE identity index value to derive the paging occasion. The operation flow/algorithmic structure 900 may include sending the UE identity index value to a base station (e.g., an eNB or a gNB) prior to receiving the request message.

Figure 10:
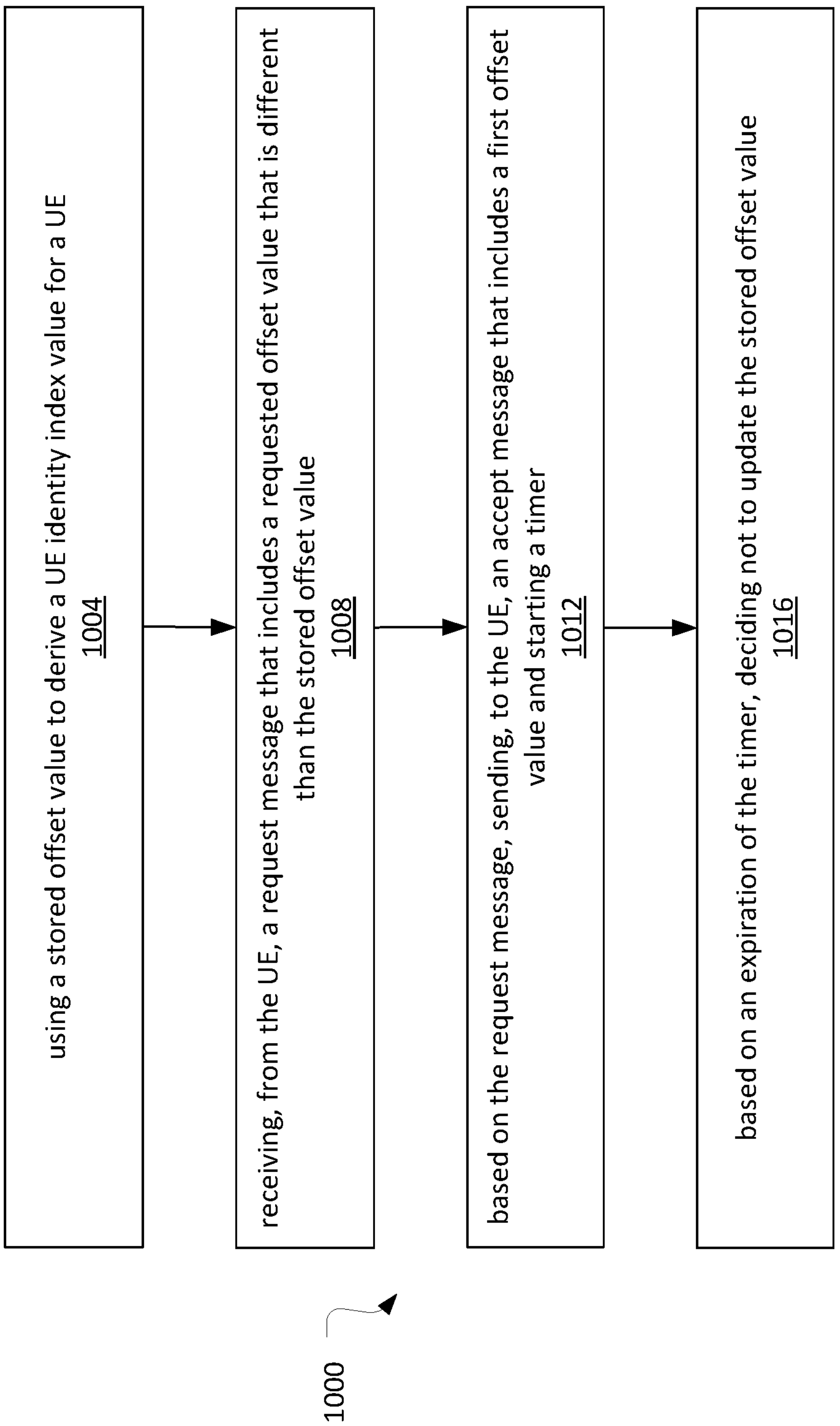
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by a network element such as, for example, MME 116 or AMF 136; or components thereof, for example, one or more processors.

The operation flow/algorithmic structure 1000 may include, at 1004, using a stored offset value to derive a UE identity index value for a UE. The UE identity index value may be, for example, a UE_ID.

The operation flow/algorithmic structure 1000 may include, at 1008, receiving, from the UE, a request message that includes a requested offset value that is different than the stored offset value. The request message may be, for example, one of an ATTACH REQUEST message and a TRACKING AREA UPDATE REQUEST message. The request message may be, for example, a REGISTRATION REQUEST message, which may indicate a request to update a registration. The requested offset value may be, for example, an IMSI offset value or a 5G-S-TMSI offset value.

The operation flow/algorithmic structure 1000 may include, at 1012, based on the request message, sending, to the UE, an accept message that includes a first offset value and starting a timer. The first offset value may be the same as the requested offset value. Alternatively, the first offset value may be different than the requested offset value. The first offset value may be, for example, a negotiated offset value (e.g., a second negotiated IMSI offset value or a second negotiated 5G-S-TMSI offset value).

The operation flow/algorithmic structure 1000 may include, at 1016, based on an expiration of the timer, deciding not to update the stored offset value. The expiration of the timer may indicate that the network element has not received a message responsive to the accept message. The operation flow/algorithmic structure 1000 may also include sending the UE identity index value to a base station (e.g., in a paging message) prior to receiving the request message and/or subsequent to the expiration of the timer.

Figure 11:
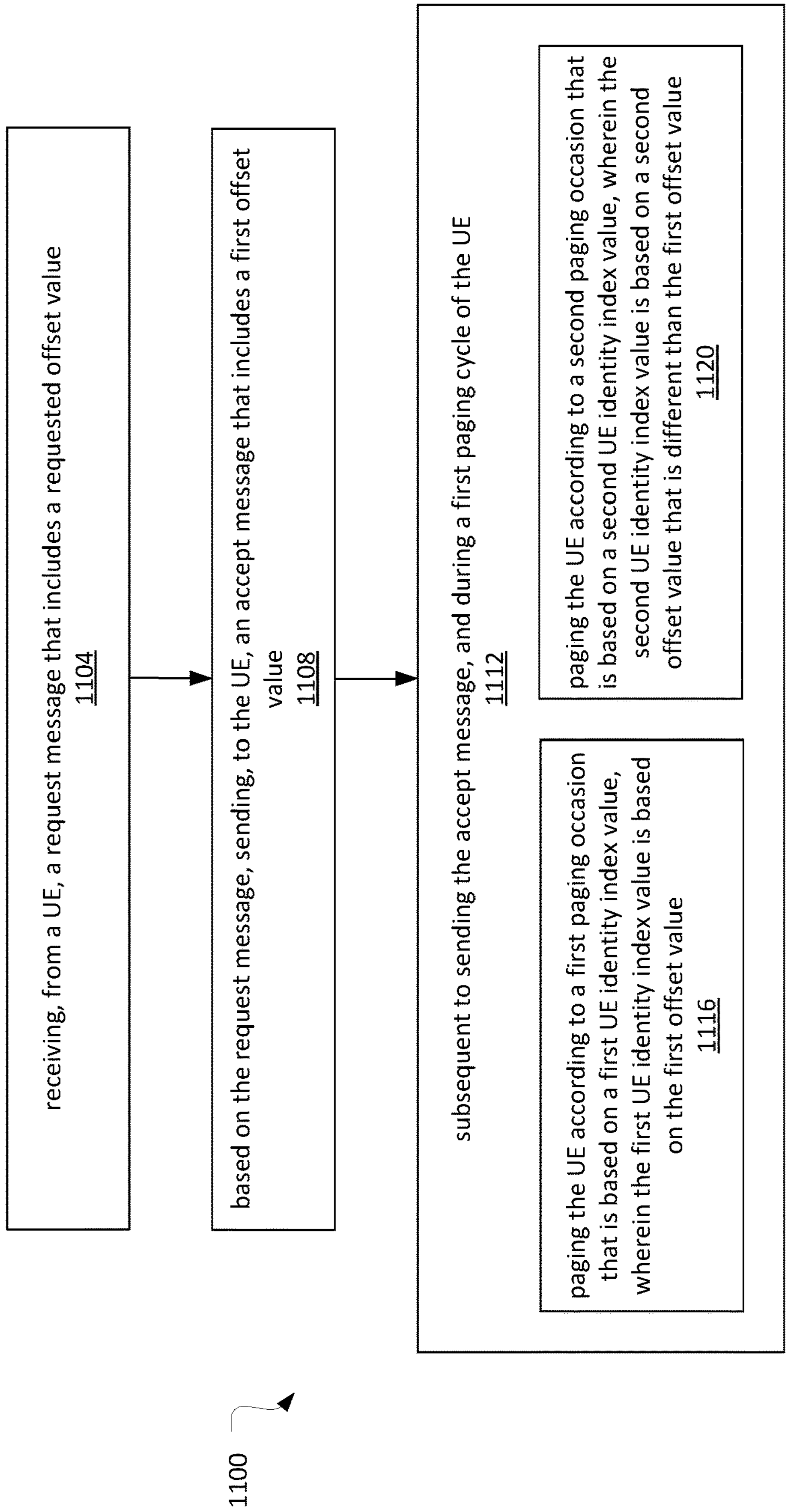
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a network element such as, for example, MME 116 or AMF 136; or components thereof, for example, one or more processors.

The operation flow/algorithmic structure 1100 may include, at 1104, receiving, from a UE, a request message that includes a requested offset value. The request message may be, for example, one of an ATTACH REQUEST message and a TRACKING AREA UPDATE REQUEST message. The request message may be, for example, a REGISTRATION REQUEST message, which may indicate a request to update a registration. The requested offset value may be, for example, an IMSI offset value or a 5G-S-TMSI offset value.

The operation flow/algorithmic structure 1100 may include, at 1108, based on the request message, sending, to the UE, an accept message that includes a first offset value. The first offset value may be the same as the requested offset value. Alternatively, the first offset value may be different than the requested offset value. The first offset value may be, for example, a negotiated offset value (e.g., a negotiated IMSI offset value or a negotiated 5G-S-TMSI offset value).

The operation flow/algorithmic structure 1100 may include, at 1112, subsequent to sending the accept message, and during a first paging cycle of the UE, performing blocks 1116 and 1120. Block 1116 may include paging the UE according to a first paging occasion that is based on a first UE identity index value, wherein the first UE identity index value is based on the first offset value. The first UE identity index value may be, for example, a UE_ID. Block 1116 may include paging the UE according to a second paging occasion that is based on a second UE identity index value, wherein the second UE identity index value is based on a second offset value that is different than the first offset value. The second offset value may be, for example, a negotiated offset value (e.g., another negotiated IMSI offset value or another negotiated 5G-S-TMSI offset value). The second UE identity index value may be, for example, a UE_ID. The operation flow/algorithmic structure 1100 may include using the first UE identity index value to derive the first paging occasion and/or using the second UE identity index value to derive the second paging occasion. The operation flow/algorithmic structure 1100 may include storing the second UE identity index value, and/or sending the second UE identity index value to a base station (e.g., an eNB or a gNB), prior to receiving the request message.

Figure 12:
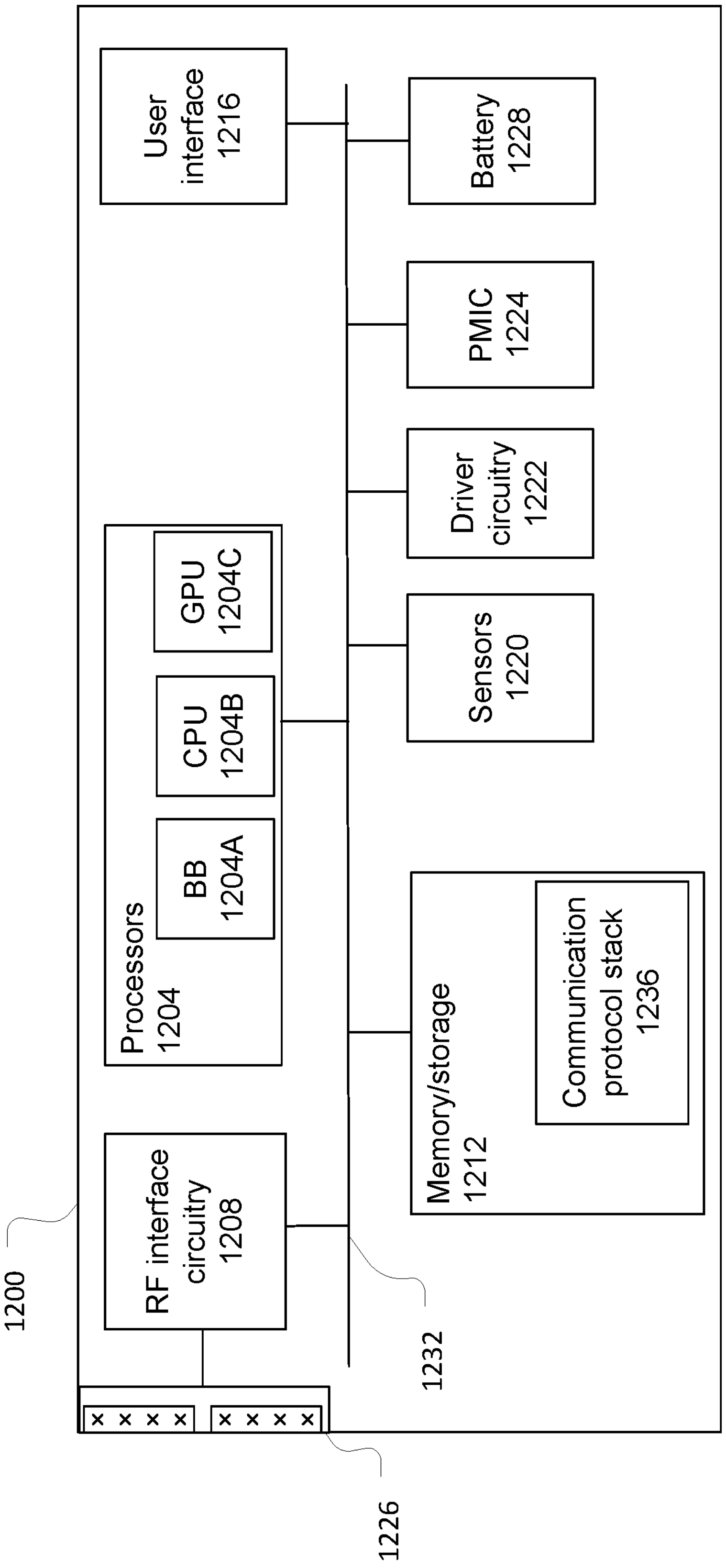
FIG. 12 illustrates a user equipment in accordance with some embodiments.

FIG. 12 illustrates a UE 1200 in accordance with some embodiments. The UE 1200 may be similar to and substantially interchangeable with UE 104 of FIG. 1.

The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200 including DRX as discussed herein.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
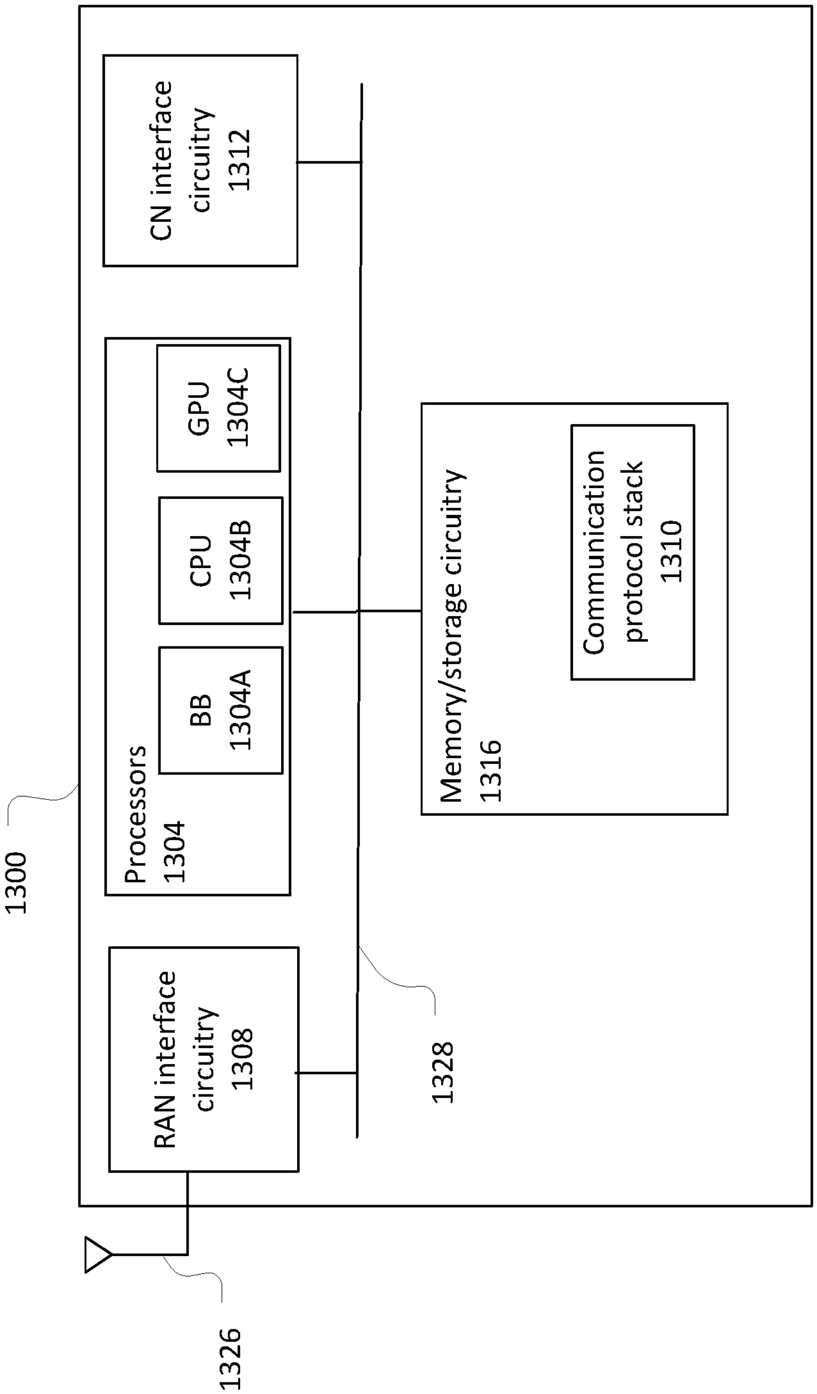
FIG. 13 illustrates a base station in accordance with some embodiments.

FIG. 13 illustrates an access node 1300 (e.g., a base station, such as an eNB or gNB) in accordance with some embodiments. The access node 1300 may be similar to and substantially interchangeable with base station 108 or 128.

The access node 1300 may include processors 1304, RF interface circuitry 1308, core network (CN) interface circuitry 1312, memory/storage circuitry 1316, and antenna structure 1326.

The components of the access node 1300 may be coupled with various other components over one or more interconnects 1328.

The processors 1304, RF interface circuitry 1308, memory/storage circuitry 1316 (including communication protocol stack 1310), antenna structure 1326, and interconnects 1328 may be similar to like-named elements shown and described with respect to FIG. 12.

The CN interface circuitry 1312 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the access node 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method comprising generating a request message that includes a requested offset value; obtaining an accept message that is responsive to the request message and includes a first offset value; in response to the accept message, generating a complete message; and based on a transmission failure of the complete message, monitoring a paging occasion that is based on a stored offset value that is different than the first offset value. Such a method may be performed by a UE (e.g., a MUSIM device) and/or by processing circuitry within a UE (e.g., a MUSIM device), such as, for example, a baseband chipset.

Example 2 includes the method of Example 1 or some other example herein, wherein the method comprises starting a timer upon a sending of the complete message, and expiration of the timer indicates the transmission failure of the complete message.

Example 3 includes the method of Example 1 or some other example herein, wherein lack of an acknowledgement of transmission of the complete message by a lower layer indicates the transmission failure of the complete message.

Example 4 includes the method of Example 1 or some other example herein, wherein the request message is one of an ATTACH REQUEST message and a TRACKING AREA UPDATE REQUEST message (e.g., in an EPS).

Example 5 includes the method of Example 1 or some other example herein, wherein the request message is a REGISTRATION REQUEST message (e.g., in a 5GS).

Example 6 includes the method of Example 5 or some other example herein, wherein the request message indicates a request to update a registration.

Example 7 includes the method of Example 1 or some other example herein, wherein the stored offset value is a negotiated offset value.

Example 8 includes the method of Example 1 or some other example herein, wherein the first offset value is the same as the requested offset value.

Example 9 includes the method of Example 1 or some other example herein, wherein the first offset value is different than the requested offset value.

Example 10 includes the method of Example 1 or some other example herein, wherein the method further comprises, based on the transmission failure of the complete message, generating a second update request that includes a second requested offset value.

Example 11 includes the method of any of Examples 1 to 10 or some other example herein, wherein the method comprises selecting the requested offset value from among a predetermined set of offset values or from a predetermined range of offset values.

Example 12 includes the method of any of Examples 1 to 11 or some other example herein, wherein the requested offset value is a requested IMSI offset value, the first offset value is a first IMSI offset value, and the stored offset value is a stored IMSI offset value.

Example 13 includes a method of operating a network element, the method comprising receiving, from a UE, a request message that includes a requested offset value; based on the request message, sending, to the UE, an accept message that includes a first offset value; and calculating a UE identity index value that is based on a second offset value, and subsequent to sending the accept message, paging the UE according to a paging occasion that is based on the UE identity index value, wherein the second offset value is different than the first offset value. Example 13 may further comprise allocating a first temporary UE identifier to the UE, wherein the accept message includes the first temporary UE identifier, the request message includes a second temporary UE identifier, and paging the UE comprises sending a paging message to the UE that includes UE identity information from the second temporary UE identifier.

Example 14 includes the method of Example 13 or some other example herein, wherein the method comprises sending the UE identity index value to a base station prior to receiving the request message.

Example 15 includes the method of Example 13 or some other example herein, wherein the request message is one of an ATTACH REQUEST message and a TRACKING AREA UPDATE REQUEST message (e.g., in an EPS).

Example 16 includes the method of Example 13 or some other example herein, wherein the request message is a REGISTRATION REQUEST message (e.g., in a 5GS).

Example 17 includes the method of Example 16 or some other example herein, wherein the request message indicates a request to update a registration.

Example 18 includes the method of Example 13 or some other example herein, wherein the second offset value is a negotiated offset value.

Example 19 includes the method of Example 13 or some other example herein, wherein the first offset value is the same as the requested offset value.

Example 20 includes the method of Example 13 or some other example herein, wherein the first offset value is different than the requested offset value.

Example 21 includes the method of any of Examples 13 to 20 or some other example herein, wherein the method comprises selecting the first offset value from among a predetermined set of offset values or from a predetermined range of offset values. Example 21 may also include allocating a first temporary UE identifier to the UE, wherein the accept message includes the first temporary UE identifier.

Example 22 includes the method of any of Examples 13 to 21 or some other example herein, wherein the requested offset value is a requested IMSI offset value, the first offset value is a first IMSI offset value, and the stored offset value is a stored IMSI offset value.

Example 23 includes the method of any of Examples 13 to 22 or some other example herein, wherein the network element is a Mobility Management Entity (e.g., in an EPS).

Example 24 includes the method of any of Examples 13 to 22 or some other example herein, wherein the network element is an Access and Mobility Management Function (e.g., in a 5GS).

Example 25 includes a method of operating a network element, the method comprising using a stored offset value to compute a UE identity index value for a UE; receiving, from the UE, a request message that includes a requested offset value that is different than the stored offset value; based on the request message, sending, to the UE, an accept message that includes a first offset value and starting a timer; and based on an expiration of the timer, deciding not to update the stored offset value.

Example 26 includes the method of Example 25 or some other example herein, wherein the expiration of the timer indicates that the network element has not received a message in response to the accept message.

Example 27 includes the method of Example 25 or some other example herein, wherein the request message is one of an ATTACH REQUEST message and a TRACKING AREA UPDATE REQUEST message.

Example 28 includes the method of Example 25 or some other example herein, wherein the request message is a REGISTRATION REQUEST message.

Example 29 includes the method of Example 25 or some other example herein, wherein the first offset value is the same as the requested offset value.

Example 30 includes the method of any of Examples 25 to 29 or some other example herein, wherein the method comprises selecting the first offset value from among a predetermined set of offset values or from a predetermined range of offset values.

Example 31 includes the method of any of Examples 25 to 30 or some other example herein, wherein the requested offset value is a requested IMSI offset value, the first offset value is a first IMSI offset value, and the stored offset value is a stored IMSI offset value.

Example 32 includes the method of any of Examples 25 to 31 or some other example herein, wherein the network element is a Mobility Management Entity.

Example 33 includes the method of any of Examples 25 to 31 or some other example herein, wherein the network element is an Access and Mobility Management Function.

Example 34 includes a method of operating a base station, the method comprising receiving, from a UE, a first transmission having a request message that includes a requested offset value; transmitting, to the UE, a second transmission having an accept message that is responsive to the request message and includes a first offset value; and receiving a UE identity index value that is based on a second offset value, and subsequent to transmitting the second transmission, sending, to the UE, a third transmission according to a paging occasion that is based on the UE identity index value, wherein the second offset value is different than the first offset value.

Example 35 includes the method of Example 34 or some other example herein, wherein the method comprises receiving the UE identity index value from a network element prior to receiving the first transmission.

Example 36 includes the method of Example 34 or some other example herein, wherein the request message is one of an ATTACH REQUEST message, and a TRACKING AREA UPDATE REQUEST message.

Example 37 includes the method of Example 34 or some other example herein, wherein the request message is a REGISTRATION REQUEST message.

Example 38 includes the method of Example 37 or some other example herein, wherein the request message indicates a request to update a registration.

Example 39 includes the method of Example 34 or some other example herein, wherein the second offset value is a negotiated offset value.

Example 40 includes the method of Example 34 or some other example herein, wherein the first offset value is the same as the requested offset value.

Example 41 includes the method of Example 34 or some other example herein, wherein the first offset value is different than the requested offset value.

Example 42 includes the method of any of Examples 34 to 41 or some other example herein, wherein the requested offset value is a requested IMSI offset value, the first offset value is a first IMSI offset value, and the second offset value is a stored IMSI offset value.

Example 43 includes a method of operating a network element, the method comprising: receiving, from a UE, a request message that includes a requested offset value; based on the request message, sending, to the UE, an accept message that includes a first offset value; and subsequent to sending the accept message, and during a first paging cycle of the UE: paging the UE according to a first paging occasion that is based on a first UE identity index value, wherein the first UE identity index value is based on the first offset value; and paging the UE according to a second paging occasion that is based on a second UE identity index value, wherein the second UE identity index value is based on a second offset value that is different than the first offset value.

Example 44 includes the method of Example 43 or some other example herein, wherein the accept message includes a temporary UE identifier.

Example 45 includes the method of Example 43 or some other example herein, wherein the method comprises, based on the request message, assigning a temporary UE identifier to the UE, wherein the accept message includes the temporary UE identifier.

Example 46 includes the method of any of Examples 43 to 46 or some other example herein, wherein the second offset value is stored by the network element prior to receiving the request message.

Example 47 includes the method of any of Examples 43 to 46 or some other example herein, wherein: the method further comprises starting a timer at a time of sending the accept message, and paging the UE according to the second paging occasion is based on an expiration of the timer.

Example 48 includes the method of Example 47 or some other example herein, wherein the expiration of the timer indicates that the network element has not received a message in response to the accept message.

Example 49 includes the method of any of Examples 43 to 48 or some other example herein, wherein the request message is one of: an ATTACH REQUEST message, a TRACKING AREA UPDATE REQUEST message (e.g., in an EPS), and a REGISTRATION REQUEST message (e.g., in a 5GS).

Example 50 includes the method of any of Examples 43 to 49 or some other example herein, wherein the first offset value is the same as the requested offset value.

Example 51 includes the method of any of Examples 43 to 49 or some other example herein, wherein the method includes selecting the first offset value from among a predetermined set of offset values or from a predetermined range of offset values.

Example 52 includes the method of any of Examples 43 to 51 or some other example herein, wherein the network element is a Mobility Management Entity (e.g., in an EPS) or an Access and Mobility Management Function (e.g., in a 5GS).

Example 53 includes the method of any of Examples 43 to 52 or some other example herein, wherein the requested offset value is a requested IMSI offset value, the first offset value is a first IMSI offset value, and the second offset value is a second IMSI offset value.

Example 54 includes the method of any of Examples 43 to 53 or some other example herein, wherein the method further comprises: subsequent to paging the UE according to the first paging occasion and paging the UE according to the second paging occasion, receiving, from the UE, a SERVICE REQUEST message, an EXTENDED SERVICE REQUEST message, or a CONTROL PLANE SERVICE REQUEST message; and responding to the SERVICE REQUEST message, EXTENDED SERVICE REQUEST message, or CONTROL PLANE SERVICE REQUEST message based on one among the first offset value and the second offset value, wherein the one among the first offset value and the second offset value is indicated by UE identity information in the SERVICE REQUEST message, EXTENDED SERVICE REQUEST message, or CONTROL PLANE SERVICE REQUEST message.

Example 55 may include an apparatus comprising means to perform one or more elements of a method described in or related to any of examples 1-54, or any other method or process described herein.

Example 56 may include one or more non-transitory computer-readable media comprising instructions to cause an electronic device, upon execution of the instructions by one or more processors of the electronic device, to perform one or more elements of a method described in or related to any of examples 1-54, or any other method or process described herein.

Example 57 may include an apparatus comprising logic, modules, or circuitry to perform one or more elements of a method described in or related to any of examples 1-54, or any other method or process described herein.

Example 58 may include a method, technique, or process as described in or related to any of examples 1-54, or portions or parts thereof.

Example 59 may include an apparatus comprising: one or more processors and one or more computer-readable media comprising instructions that, when executed by the one or more processors, cause the one or more processors to perform the method, techniques, or process as described in or related to any of examples 1-54, or portions thereof.

Example 60 may include a signal as described in or related to any of examples 1-54, or portions or parts thereof.

Example 61 may include a datagram, information element, packet, frame, segment, PDU, or message as described in or related to any of examples 1-54, or portions or parts thereof, or otherwise described in the present disclosure.

Example 62 may include a signal encoded with data as described in or related to any of examples 1-54, or portions or parts thereof, or otherwise described in the present disclosure.

Example 63 may include a signal encoded with a datagram, IE, packet, frame, segment, PDU, or message as described in or related to any of examples 1-54, or portions or parts thereof, or otherwise described in the present disclosure.

Example 64 may include an electromagnetic signal carrying computer-readable instructions, wherein execution of the computer-readable instructions by one or more processors is to cause the one or more processors to perform the method, techniques, or process as described in or related to any of examples 1-54, or portions thereof.

Example 65 may include a computer program comprising instructions, wherein execution of the program by a processing element is to cause the processing element to carry out the method, techniques, or process as described in or related to any of examples 1-54, or portions thereof.

Example 66 may include a signal in a wireless network as shown and described herein.

Example 67 may include a method of communicating in a wireless network as shown and described herein.

Example 68 may include a system for providing wireless communication as shown and described herein.

Example 69 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:

identify a request message, from a user equipment (UE), that includes a requested offset value;

generate an accept message that includes a negotiated offset value, the accept message to be provided to the UE;

generate a paging message with a first international mobile subscriber identity (IMSI) value and a second IMSI value, the paging message to be provided to the UE;

identify a response message, from the UE, that includes a global unique temporary identifier (GUTI) corresponding to the first IMSI value or the second IMSI value; and determine, based on the GUTI, that one of the first IMSI value or the second IMSI value is invalid.

2. The one or more non-transitory computer-readable media of claim 1, wherein the paging message is to be provided to the UE using the first IMSI value and the second IMSI value based at least in part on a lower layer failure related to a complete message.

3. The one or more non-transitory computer-readable media of claim 2, wherein the complete message is a tracking area update complete message.

4. The one or more non-transitory computer-readable media of claim 1, wherein the paging message is to be provided to the UE using the first IMSI value and the second IMSI value during a window.

5. The one or more non-transitory computer-readable media of claim 4, wherein the window is a paging cycle.

6. The one or more non-transitory computer-readable media of claim 1, wherein the paging message is to be provided to the UE using the first IMSI value and the second IMSI value subsequent to the accept message being provided.

7. The one or more non-transitory computer-readable media of claim 1, wherein the negotiated offset value is a negotiated IMSI offset value.

8. The one or more non-transitory computer-readable media of claim 1, wherein the request message is a tracking area update request message, and wherein the accept message is a tracking area update accept message.

9. A method, comprising:

receiving a request message, from a user equipment (UE), that includes a requested offset value;

generating, for transmission, an accept message that includes a negotiated offset value, the accept message to be provided to the UE;

generating, for transmission, a paging message with a first international mobile subscriber identity (IMSI) value and a second IMSI value, the paging message to be provided to the UE;

identifying, from the UE, a global unique temporary identifier (GUTI) corresponding to the first IMSI value or the second IMSI value; and determining, based on the GUTI, that one of the first IMSI value or the second IMSI value is invalid.

10. The method of claim 9, wherein the paging message is to be provided to the UE using the first IMSI value and the second IMSI value based at least in part on a lower layer failure related to a complete message.

11. The method of claim 9, further comprising:

identifying a response, message received from the UE, wherein the response message indicates the GUTI.

12. The method of claim 9, wherein the UE is paged using the first IMSI value and the second IMSI value during a window.

13. The method of claim 9, wherein the UE is paged using the first IMSI value and the second IMSI value subsequent to the accept message being transmitted.

14. The method of claim 9, wherein the request message is a tracking area update request message, and wherein the accept message is a tracking area update accept message.

15. The method of claim 9, wherein the paging message is generated based at least in part on a lower layer failure related to a tracking area update complete message.

16. An apparatus comprising:

processing circuitry to:

identify a request message, from a user equipment (UE), that includes a requested offset value;

generate an accept message that includes a negotiated offset value, the accept message to be provided to the UE;

generate a paging message with a first international mobile subscriber identity (IMSI) value and a second IMSI value, the paging message to be provided to the UE;

identify a response message that includes a global unique temporary identifier (GUTI) corresponding to the first IMSI value or the second IMSI value; and determine, based on the GUTI, that one of the first IMSI value or the second IMSI value is invalid; and interface circuitry coupled to the processing circuitry, the interface circuitry to identify the response message.

17. The apparatus of claim 16, wherein the paging message is to be provided to the UE using the first IMSI value and the second IMSI value based at least in part on a lower layer failure related to a complete message.

18. The apparatus of claim 16, wherein the paging message is generated based at least in part on a lower layer failure related to a tracking area update complete message.

* * * * *